US009211793B2

(12) United States Patent
Yasuda et al.

(10) Patent No.: US 9,211,793 B2
(45) Date of Patent: Dec. 15, 2015

(54) VEHICLE TRANSAXLE SYSTEM

(75) Inventors: Toshifumi Yasuda, Hyogo (JP); Masaru Iida, Hyogo (JP); Hideki Kanenobu, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 1081 days.

(21) Appl. No.: 12/477,428

(22) Filed: Jun. 3, 2009

(65) Prior Publication Data

US 2009/0301076 A1 Dec. 10, 2009

(30) Foreign Application Priority Data

Jun. 6, 2008 (JP) ................................. 2008-149974

(51) Int. Cl.
*B60K 17/28* (2006.01)
*B60K 17/10* (2006.01)
*A01D 34/69* (2006.01)
*F16H 61/427* (2010.01)

(52) U.S. Cl.
CPC .............. *B60K 17/105* (2013.01); *A01D 34/69* (2013.01); *F16H 61/427* (2013.01); *B60K 17/28* (2013.01); *B60Y 2200/223* (2013.01)

(58) Field of Classification Search
CPC ......... A01D 34/76; B60K 17/28; E02F 9/225; E02F 9/2253
USPC .............................. 60/484, 490, 443; 92/12.2
See application file for complete search history.

(56) References Cited

U.S. PATENT DOCUMENTS

| | | | | |
|---|---|---|---|---|
| 3,054,263 A | * | 9/1962 | Budzich et al. | 60/490 |
| 3,213,619 A | * | 10/1965 | Creighton et al. | 60/492 |
| 3,299,829 A | * | 1/1967 | Jackson et al. | 92/12.2 |
| 3,807,174 A | * | 4/1974 | Wagenseil et al. | 60/490 |
| 3,938,401 A | * | 2/1976 | Bauer | 74/471 R |
| 3,975,990 A | * | 8/1976 | Kraus | 92/71 |
| 4,722,186 A | * | 2/1988 | Louis et al. | 60/484 |
| 5,975,858 A | * | 11/1999 | Shimotomai | 60/443 |

(Continued)

FOREIGN PATENT DOCUMENTS

| | | |
|---|---|---|
| CA | 2 417 313 A1 | 7/2003 |
| DE | 195 22 877 A1 | 2/1996 |

*Primary Examiner* — F. Daniel Lopez
(74) *Attorney, Agent, or Firm* — Sterne, Kessler, Goldstein & Fox PLLC

(57) ABSTRACT

A vehicle transaxle system includes a pair of right and left transaxle units equipped on a vehicle. The right transaxle unit supports a single right axle, and the left transaxle unit supports a single left axle. A variable displacement hydraulic pump is disposed in each of the right and left transaxle units so as to be driven by power from a prime mover of the vehicle. A variable displacement hydraulic motor is disposed in each of the right and left transaxle units and is fluidly connected to the corresponding hydraulic pump so as to drive the corresponding right or left axle. A movable motor displacement control member is provided in each of the transaxle unit so as to be moved to change the displacement of the corresponding hydraulic motor. An interlocking connection means is connected to both the movable motor displacement control members of the respective hydraulic motors. The vehicle is provided with a first manipulator for changing displacements of the hydraulic pumps, and is provided with a second manipulator for operating the interlocking connection means. The interlocking connection means is operated by operating the second manipulator so as to synchronously move both the movable motor displacement control members.

4 Claims, 18 Drawing Sheets

(56) References Cited

U.S. PATENT DOCUMENTS

| | | | |
|---|---|---|---|
| 6,202,014 B1 * | 3/2001 | Brandt et al. | 60/484 |
| 6,385,971 B1 | 5/2002 | Abend et al. | |
| 7,290,390 B2 * | 11/2007 | Kim | 60/484 |
| 7,549,498 B2 * | 6/2009 | Lunzman et al. | 180/242 |

* cited by examiner (a)

(b)

(a)

(b)

VEHICLE TRANSAXLE SYSTEM

BACKGROUND OF THE INVENTION

1. Field of the Invention

The present invention relates to a vehicle transaxle system for a vehicle, especially, for a working vehicle equipped with a working device, e.g., a lawn mower equipped with a mower unit, wherein the vehicle transaxle system includes right and left transaxle units each of which supports a right or left corresponding single axle.

2. Related Art

As disclosed in U.S. Pat. No. 6,385,971, there is a well-known conventional zero-turn type vehicle transaxle system for a working vehicle, such as a lawn mower, for enabling zero-turn of the vehicle, thereby ensuring a satisfactory working efficiency. The transaxle system includes right and left hydraulic transaxle units each of which supports a right or left corresponding single axle. Each of the transaxle units includes a hydrostatic transmission for driving the corresponding axle, and the hydrostatic transmission includes hydraulic pump and motor fluidly connected to each other through a closed fluid circuit.

In each of the transaxle units of the conventional transaxle system, the hydraulic pump has a variable displacement, and the hydraulic motor has a fixed displacement, so that the output rotary speed of the hydraulic motor depends on controlling of the displacement of the hydraulic pump. Even if the maximum displacement of the hydraulic pump is sufficient to ensure a high torque traveling of the vehicle at work, it may be insufficient to ensure a required efficient power transmission for normal high-speed traveling of the vehicle without work. Therefore, conventionally, the transaxle unit further includes a sub speed-changing transmission, such as a gear transmission, that has at least two low-and-high speed drive trains and is interposed between the hydraulic motor and the axle. When the vehicle without work normally travels at a high speed, the high speed drive train of the sub speed-changing transmission is selected for driving the axle, so as to compensate for the lack of efficiency of power transmission by the hydrostatic transmission. However, the conventional transaxle unit is expanded in size and is expensive because of the arrangement of the sub speed-changing transmission.

Further, a sub speed-changing manipulator for operating the sub speed-changing transmission may be wrongly operated during traveling of the vehicle. For example, although a skilled operator can shift the sub speed-changing manipulator to a high speed setting position at an appropriate timing during traveling of the vehicle at work so as to improve the working efficiency, the operation of the sub speed-changing manipulator is too difficult for an unskilled operator to judge a timing for shifting the sub speed-changing manipulator to the high speed setting position, so that the unskilled operator may shift the sub speed-changing manipulator to the high speed setting position at a wrong timing so as to unexpectedly accelerate the vehicle and to spoil the stability of work. Further, if the vehicle frequently moves from one work area to another work area, a drive train for the working device must be clutched on and off on every movement of the vehicle between work areas. The high speed level of the sub speed-changing transmission may be desired during the movement of the vehicle between work areas. However, to perform both the clutch operation and the sub speed-changing operation is difficult and likely to unexpectedly keep the driving of the working device during the movement of the vehicle setting the high speed level of the sub speed-changing transmission, thereby causing power loss and spoiling the stability of work.

Further, the sub-speed changing operation during traveling of the vehicle causes sudden change of traveling speed of the vehicle. Especially, the zero-turn type vehicle may be provided with a pair of right and left main speed-changing manipulators for controlling the respective hydraulic pumps of the respective right and left transaxle units. In this case, the manipulation of the right and left main speed-changing manipulators for the main speed-changing and left-and-right turning of the vehicle is complicated and likely to cause the wrong sub speed-changing operation. Therefore, the vehicle is desired to avoid unexpected speed change even if the sub speed-changing manipulator is wrongly operated.

SUMMARY OF THE INVENTION

A first object of the invention is to provide a vehicle transaxle system for a vehicle, especially, for a working vehicle, the vehicle transaxle system including right and left hydraulic transaxle units individually driving respective right and left axles, wherein each of the transaxle units includes a hydrostatic transmission for driving the axle without an additional sub speed-changing transmission interposed between the hydrostatic transmission and the axle, however, it ensures a sufficient efficiency in power transmission to the axle for a normal high-speed traveling of the vehicle (without work).

To achieve the first object, a vehicle transaxle system according to the invention comprises a pair of right and left transaxle units equipped on a vehicle. The right transaxle unit supports a single right axle, and the left transaxle unit supports a single left axle. A variable displacement hydraulic pump is disposed in each of the right and left transaxle units so as to be driven by power from a prime mover of the vehicle. A variable displacement hydraulic motor is disposed in each of the right and left transaxle units and is fluidly connected to the corresponding hydraulic pump so as to drive the corresponding right or left axle. A movable motor displacement control members is provided in each of the transaxle unit so as to be moved to change the displacement of the corresponding hydraulic motor. An interlocking connection means is connected to both the movable motor displacement control members of the respective hydraulic motors. The vehicle is provided with a first manipulator for changing displacements of the hydraulic pumps, and is provided with a second manipulator for operating the interlocking connection means. The interlocking connection means is operated by operating the second manipulator so as to synchronously move both the movable motor displacement control members.

Therefore, the variable displacement hydraulic motors of the respective transaxle units replace a mechanical (e.g., gear type) sub speed-changing transmission, thereby minimizing and economizing the transaxle units. A vehicle equipped with the vehicle transaxle system is provided with a wide traveling speed range realized by combination of the variable displacement range of the hydraulic pumps and the variable displacement range of the hydraulic motors, which can be divided into a working traveling speed range suitable for sure and efficient works by a working device equipped on the vehicle and a normal traveling speed range suitable for normal traveling of the vehicle without work. The interlocking connection means connected to the movable motor displacement control members of the respective hydraulic motors changes the displacements of the hydraulic motors synchronously so that an operator can easily operate the second manipulator (as a sub speed-changing operation) to synchronously change the rotary speed levels of both the right and left axles, thereby easily selecting either the working traveling speed range or the normal traveling speed range.

Preferably, as a first aspect of the vehicle transaxle system, the interlocking connection means includes a pair of operation members connected to the respective movable motor displacement control members, a push-pull type actuator, and a mechanical connection member connecting the push-pull type actuator to both the operation members.

Therefore, the interlocking connection means has a simple configuration for its control of movement, thereby reducing costs and facilitating maintenance.

In the first aspect of the vehicle transaxle system, preferably, the push-pull type actuator is a hydraulic actuator activated by fluid extracted from at least one of the right and left transaxle units.

Therefore, the push-pull type actuator requires no additional hydraulic fluid source, and therefore it requires no additional associated equipments such as a hydraulic pump, a tank and piping, thereby reducing the number of parts and costs, facilitating maintenance, and minimizing the vehicle transaxle system.

In the first aspect of the vehicle transaxle system, preferably, the push-pull type actuator is activated by use of a solenoid.

Therefore, the response of the push-pull type actuator, i.e., of the synchronous displacement change of the hydraulic motors, to the operation of the second manipulator, thereby enabling a swift sub speed-change of the vehicle. Further, the solenoid can be combined with the later-discussed checking elements so as to constitute an electric control circuit.

Alternatively, preferably, as a second aspect of the vehicle transaxle system, the interlocking connection means includes a pair of rotary actuators having respective rotatable output elements, and a pair of rotatable operation members connected to the respective movable motor displacement control members. Each of the rotatable operation members is rotated by rotation of the output element of the corresponding rotary actuator. The interlocking connection means further includes a controller which controls rotations of the output elements of the respective rotary actuators so as to synchronously rotate both the rotatable operation members.

Therefore, the pair of right and left transaxle units can be provided with the respective rotary actuators and the respective rotatable operation members, so that the pair of rotary actuators and the pair of rotatable operation members require no mechanical connection member, such as a link rod or an arm, for their mutual connection. Thus, the vehicle does not have a space for arranging such a mechanical connection member between the right and left rotary actuators or between the right and left rotatable operation members, thereby expanding a free space in the vehicle for other members, or minimizing the size of the vehicle.

A second object of the invention is to provided the above-mentioned vehicle transaxle system, wherein each of the movable motor displacement control members is shiftable between a high speed position for setting a high rotary speed level of the corresponding hydraulic motor and axle and a low speed position for setting a low rotary speed level of the corresponding hydraulic motor and axle, and wherein both the movable motor displacement control members are held at respective proper or desired (high speed or low speed) positions in spite of wrong operation of the second manipulator.

In this regard, preferably, the second manipulator is shiftable between a high speed position and a low speed position. When the second manipulator is set at the high speed position, the interlocking connection means synchronously sets both the movable motor displacement control members at the respective high speed positions. When the second manipulator is set at the low speed position, the interlocking connection means synchronously sets both the movable motor displacement control members at the respective low speed positions.

To achieve the second object, preferably, as a third aspect of the vehicle transaxle system, the vehicle transaxle system further comprises a controller for controlling the interlocking connection means, and a high-speed prevention setting means shiftable between a high-speed prevention state and a high-speed allowance state. When the high-speed prevention setting means is set in the high-speed allowance state, the controller allows the interlocking connection means to be operated to set both the movable motor displacement control members at the respective high speed positions according to setting the second manipulator at the high speed position. When the high-speed prevention setting means is set in the high-speed prevention state, the controller prevents the interlocking connection means from being operated to set both the movable motor displacement control members at the respective high speed positions in spite of setting the second manipulator at the high speed position.

Therefore, even if an operator is unskilled, the operator can ensure stable work because the low rotary speed level of the axles is kept even if the operator wrongly shifts the second manipulator to the high speed position.

To achieve the second object, preferably, as a fourth aspect of the vehicle transaxle system, the vehicle is equipped with a working device, and the vehicle transaxle system further comprises a controller which allows the working device to be driven by the prime mover only when the movable motor displacement control members are set at the respective low speed positions.

Therefore, if the second manipulator is shifted to set both the movable motor displacement control members at the respective high speed positions during movement of the vehicle from one work area to another work area, the driving of the working device by the prime mover is surely interrupted automatically according to the operation of the second manipulator, whereby the working device is prevented from being uselessly driven, thereby avoiding power loss and ensuring the stability of work. The operability is improved because the operator does not have to operate a clutch of the drive train to the working device in connection with the operation of the second manipulator.

In the fourth aspect of the vehicle transaxle system, preferably, the controller allows the working device to be driven by the prime mover only when the movable motor displacement control members are set at the respective low speed positions by setting the second manipulator at the low speed position or by setting the high-speed prevention setting means in the high-speed prevention state.

Therefore, both the effect of the third aspect and the effect of the fourth aspect can be obtained.

Preferably, the interlocking connection means is allowed to be operated to move the movable motor displacement control members only when the first manipulator is operated to set both the hydraulic pumps in respective neutral states.

Therefore, during traveling of the vehicle while power of the prime mover is transmitted to at least one of the axles, even if the second manipulator is shifted by mistake, the movement of the movable motor displacement control members actually starts after the manipulator is operated to set both the hydraulic motors in respective neutral states. In this way, during the above-mentioned traveling of the vehicle, the traveling speed of the vehicle is prevented from being suddenly changed.

These and other objects, features and advantages will appear more fully in the following detailed description with reference to the attached drawings.

DETAILED DESCRIPTION OF THE INVENTION

Figure 1:
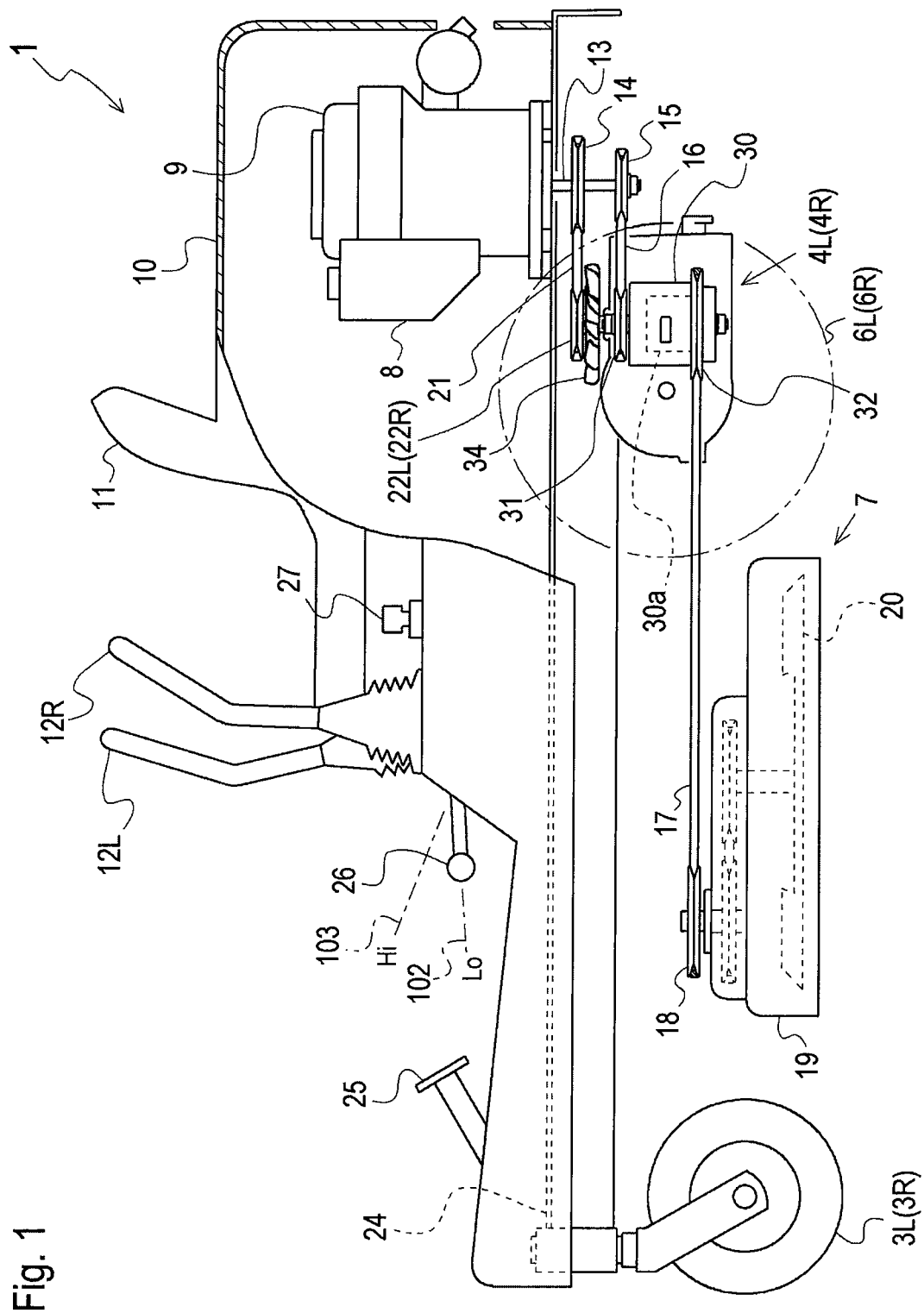
FIG. 1 is a schematic side view of a lawn mower serving as an embodiment of a working vehicle equipped with a vehicle transaxle system according to the invention.
Figure 2:
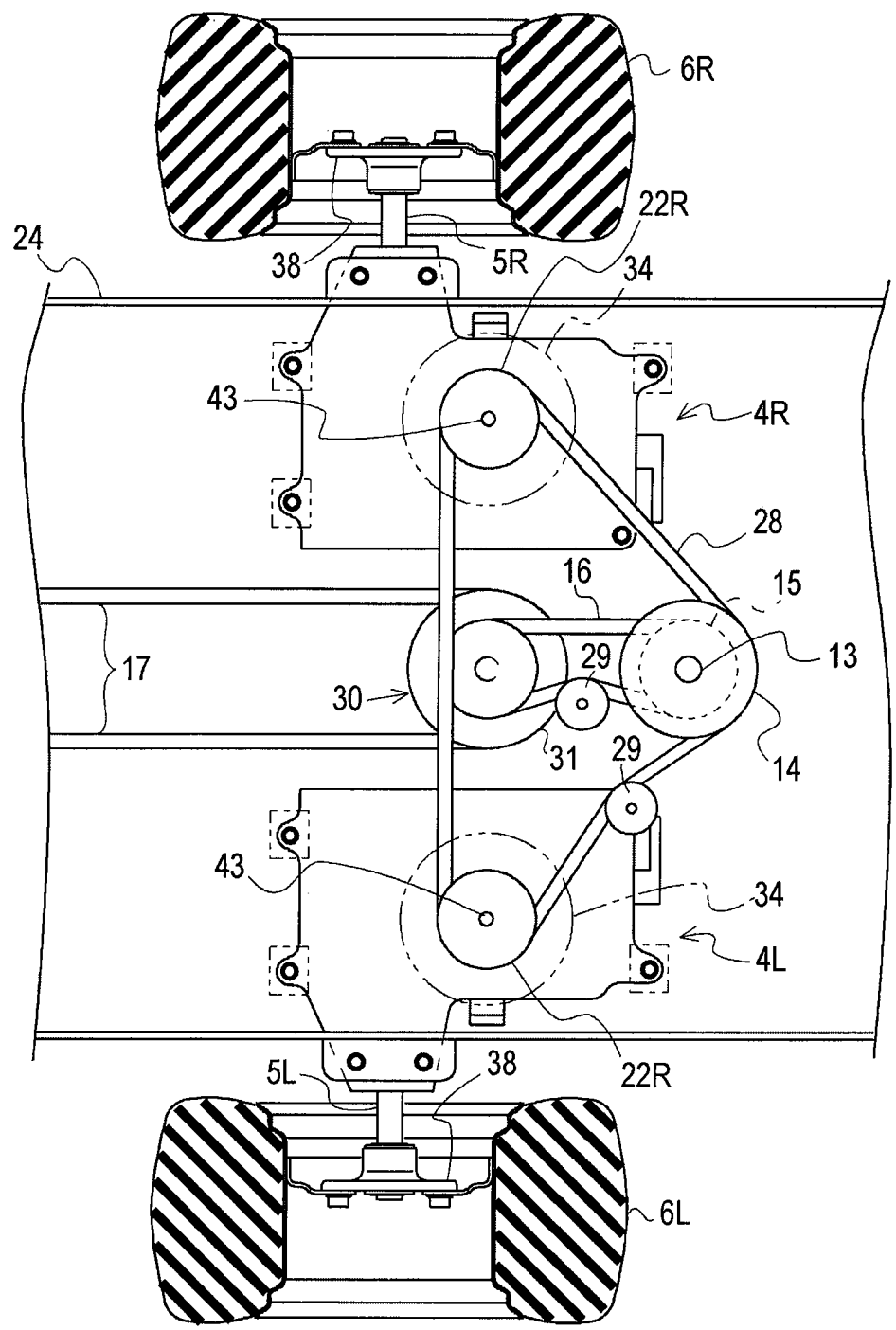
FIG. 2 is a sectional plan view of a rear portion of the lawn mower.
Figure 9:
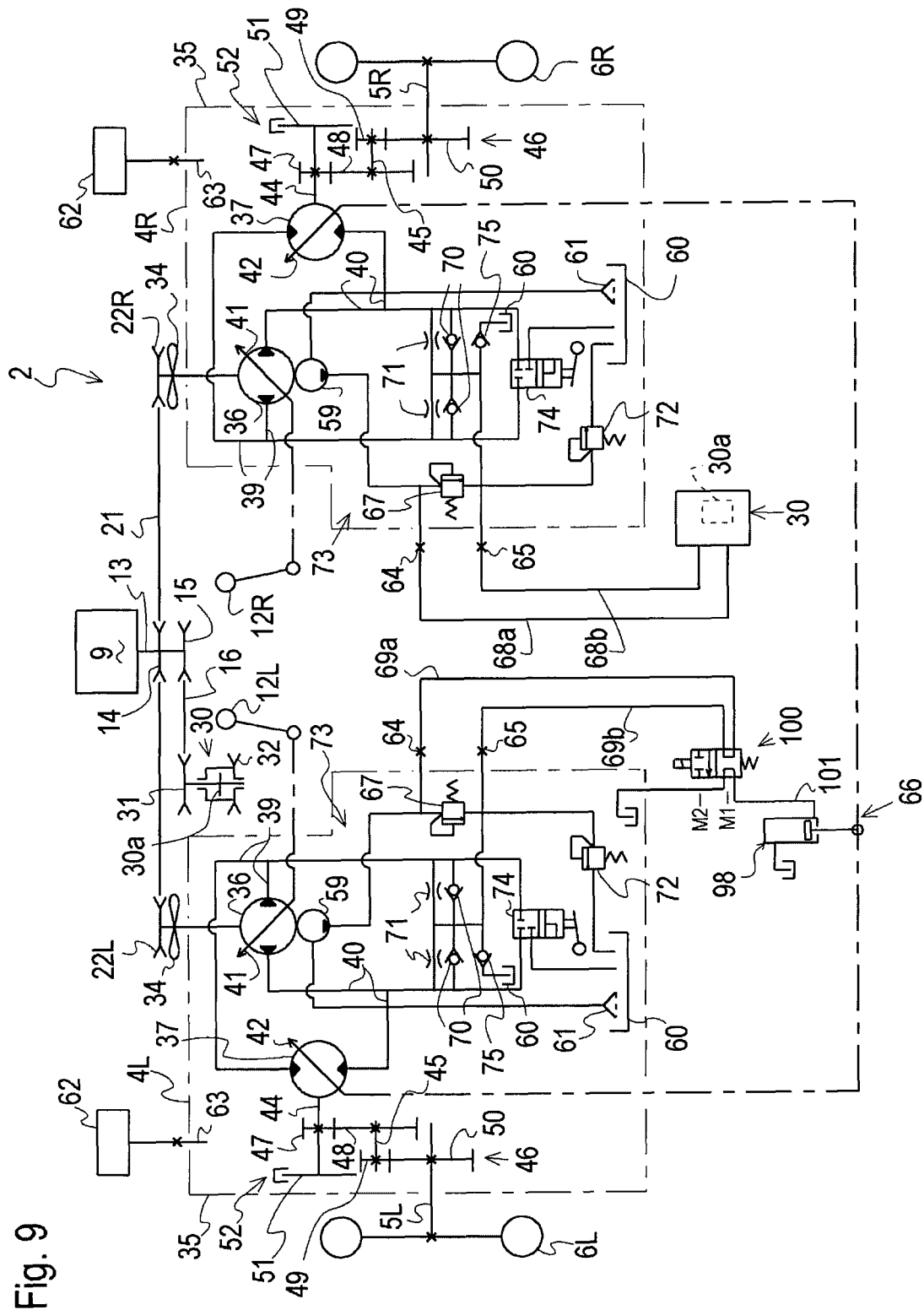
FIG. 9 is a diagram of a hydraulic circuit of the vehicle transaxle system.

Referring to FIGS. 1, 2 and 9, description will be given of a general structure of a lawn mower serving as an embodiment of a hydraulically driven working vehicle 1 equipped with a transaxle system 2. Vehicle 1 includes a fore-and-aft extended vehicle body frame 24. Vehicle body frame 24 supports right and left front wheels (casters) 3R and 3L at right and left front portions thereof, and supports right and left transaxle units 4R and 4L constituting transaxle system 2 at right and left rear portions thereof.

Working vehicle 1 has a pair of right and left rear wheels 6R and 6L fixed on axially distal ends of respective right and left horizontal lateral axles 5R and 5L. Right transaxle unit 4R supports right axle 5R and extends right axle 5R rightwardly outward to right rear wheel 6R. Left transaxle unit 4L supports left axle 5L and extends left axle 5L leftwardly outward to left rear wheel 6L.

A mower unit 7 is disposed below a fore-and-aft intermediate portion of vehicle body frame 24 between front wheels 3R, 3L and rear wheels 6R, 6L. A prime mover 9, such as an internal combustion engine, is mounted on a rear portion of vehicle body frame 24 and is provided on a front end thereof with a fuel tank 8.

Working vehicle 1 is provided with a cover 10 covering vehicle body frame 24. A rear portion of cover 10 serves as a bonnet covering prime mover 9. A fore-and-aft intermediate portion of cover 10 is extended from the rear portion thereof covering prime mover 9, and is provided with a driver's seat 11 thereon. Right and left traveling control levers 12R and 12L, serving as a first manipulator for controlling later-discussed hydraulic pumps 36 (see FIG. 4) of transaxle units 4R and 4L, are provided on cover 10 at forward right and left sides of seat 11. A front portion of cover 10 is extended forward from the fore-and-aft intermediate portion of cover 10 on which seat 11 is mounted, and is formed lower than the fore-and-aft intermediate portion of cover 10 so as to serve as a platform. A brake pedal 25 is disposed on the front portion of cover 10.

A speed shift lever 26, serving as a second manipulator for controlling later-discussed hydraulic motors 37 (see FIG. 3) of transaxle units 4R and 4L, is provided on a front end of the fore-and-aft intermediate portion of cover 10 below seat 11 so as to be switchable between a low speed position 102 and a high speed position 103. An alternative speed shift manipulator, such as a later-discussed pedal 128 or a switch, may serve as the second manipulator for controlling hydraulic motors 37.

An instrumental panel is extended on an upper surface of the fore-and-aft intermediate portion of cover 10 along a right or left side of seat 11 and is provided with a key switch. The key switch is provided with a key slot and is switched on for allowing hydraulic motors 37 to be set in a high speed mode according to shift of speed shift lever 26 to high speed position 103 only when a safety control key 27 is inserted into the key slot, whereby an unskilled operator having no safety control key 27 is prevented from unexpected high-speed traveling. A later-discussed high-speed alarm lamp 125 (see FIG. 13) is provided on the instrumental panel.

Prime mover 9 has an output shaft 13 extended vertically downward therefrom. An upper pulley 14 and a lower pulley 15 are fixed on output shaft 13. A belt 28 is looped over upper pulley 14, is pressed by a tension pulley 29, and is looped over input pulleys 22R and 22L of respective right and left transaxle units 4R and 4L, so as to transmit the power of prime mover 9 to later-discussed hydrostatic transmissions (hereinafter, referred to as "HSTs") in respective right and left transaxle units 4R and 4L for driving respective right and left rear wheels 6R and 6L. Input pulleys 22R and 22L are provided with respective cooling fans 34 rotatable together therewith.

A PTO clutch unit 30 incorporating a PTO clutch 30a, such as a hydraulic clutch, is hung downward from vehicle body frame 24 in front of lower pulley 15. A dead space between right and left transaxle units 4R and 4L is used for arranging PTO clutch unit 30 so as to fore-and-aft minimize vehicle 1. A belt 16 is looped over lower pulley 15, is pressed by a tension pulley 29, and is looped over an input pulley 31 of PTO clutch unit 30. PTO clutch unit 30 is provided with an output pulley 32 to be drivingly connected to input pulley 31 via engaged PTO clutch 30a. A belt 17 is looped over output pulley 32 and a mower input pulley 18 of mower unit 7. Mower unit 7 includes a mower deck 19 incorporating rotary blades 20 driven by rotation of mower input pulley 18. Mower unit 7 is provided with a hydraulic lift for vertically moving mower deck 19.

Each of transaxle units 4R and 4L incorporates an HST 73 (see FIG. 9) including a variable displacement hydraulic pump 36 and a variable displacement hydraulic motor 37 fluidly connected to hydraulic pump 36 so as to drive corresponding axle 5R or 5L by an output power of hydraulic motor 37. Hydraulic pump 36 is provided with a movable swash plate 41 serving as a movable pump displacement control member.

Right traveling control lever 12R is operatively connected to movable swash plate 41 of hydraulic pump 36 of right transaxle unit 4R, and left traveling control lever 12L is operatively connected to movable swash plate 41 of hydraulic pump 36 of left transaxle unit 4L. When each of traveling control lever 12R and 12L is disposed at a neutral position, corresponding movable swash plate 41 is disposed at a neutral position so as to stop fluid supply from corresponding hydraulic pump 36 to corresponding hydraulic motor 37. As each of traveling control levers 12R and 12L is rotated forward from the neutral position, corresponding movable swash plate 41 is tilted to increase forward traveling speed of corresponding axle 5R or 5L and rear wheel 6R or 6L. As each of traveling control levers 12R and 12L is rotated rearward from the neutral position, corresponding movable swash plate 41 is tilted to increase backward traveling speed of corresponding axle 5R or 5L and rear wheel 6R or 6L. By synchronous rotation of right and left traveling control levers 12R and 12L, the rotary speeds and directions of right and left axles 5R and 5L and rear wheels 6R and 6L are equally changed so as to change the forward or backward straight traveling speed and direction of vehicle 1. By differential rotation of right and left traveling control levers 12R and 12L, the rotary speeds and directions of right and left axles 5R and 5L and rear wheels 6R and 6L are differentially changed so as to turn vehicle 1 leftward or rightward.

Figure 3:
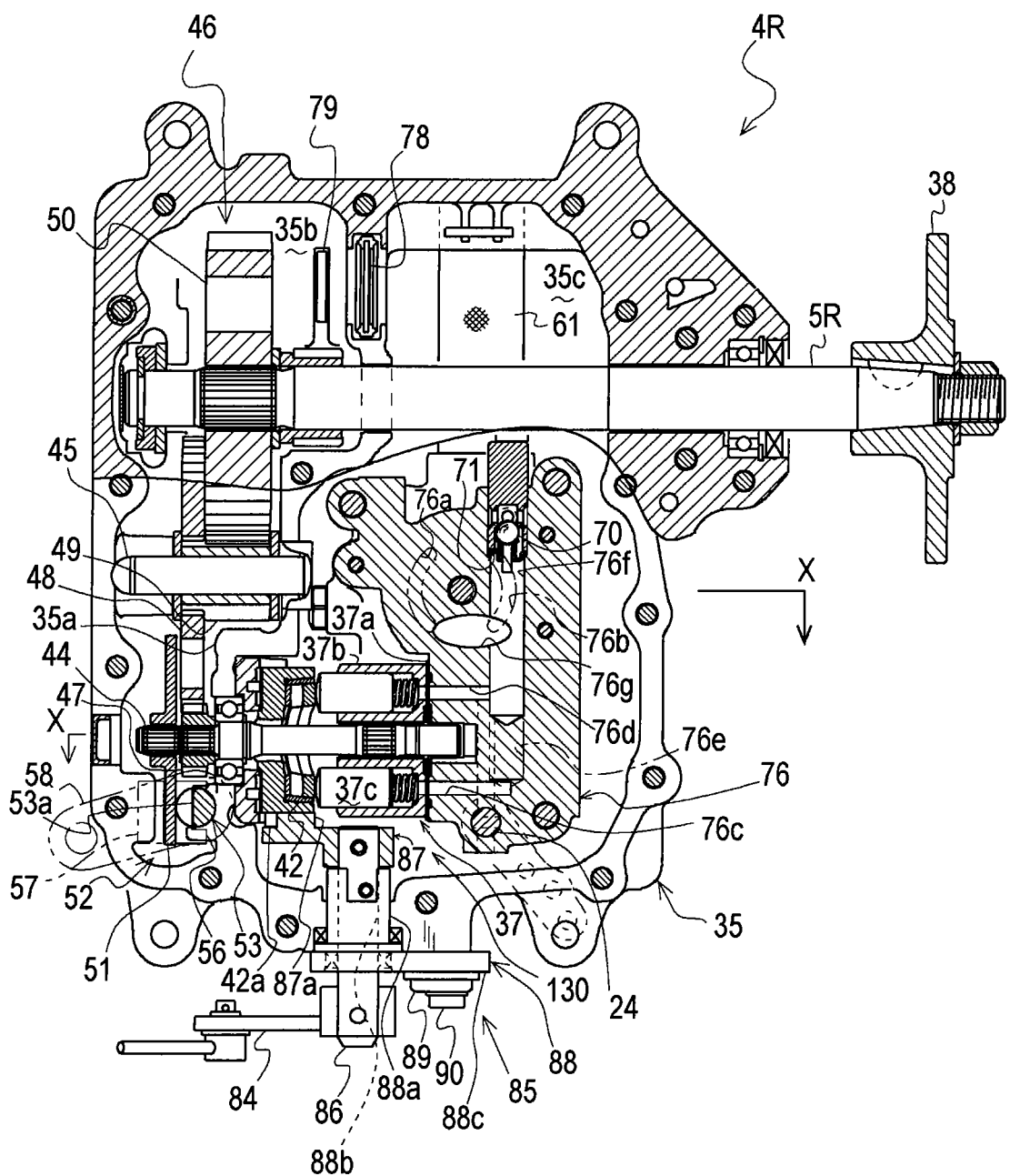
FIG. 3 is a sectional plan view of a right transaxle unit for the vehicle transaxle system.
Figure 5:
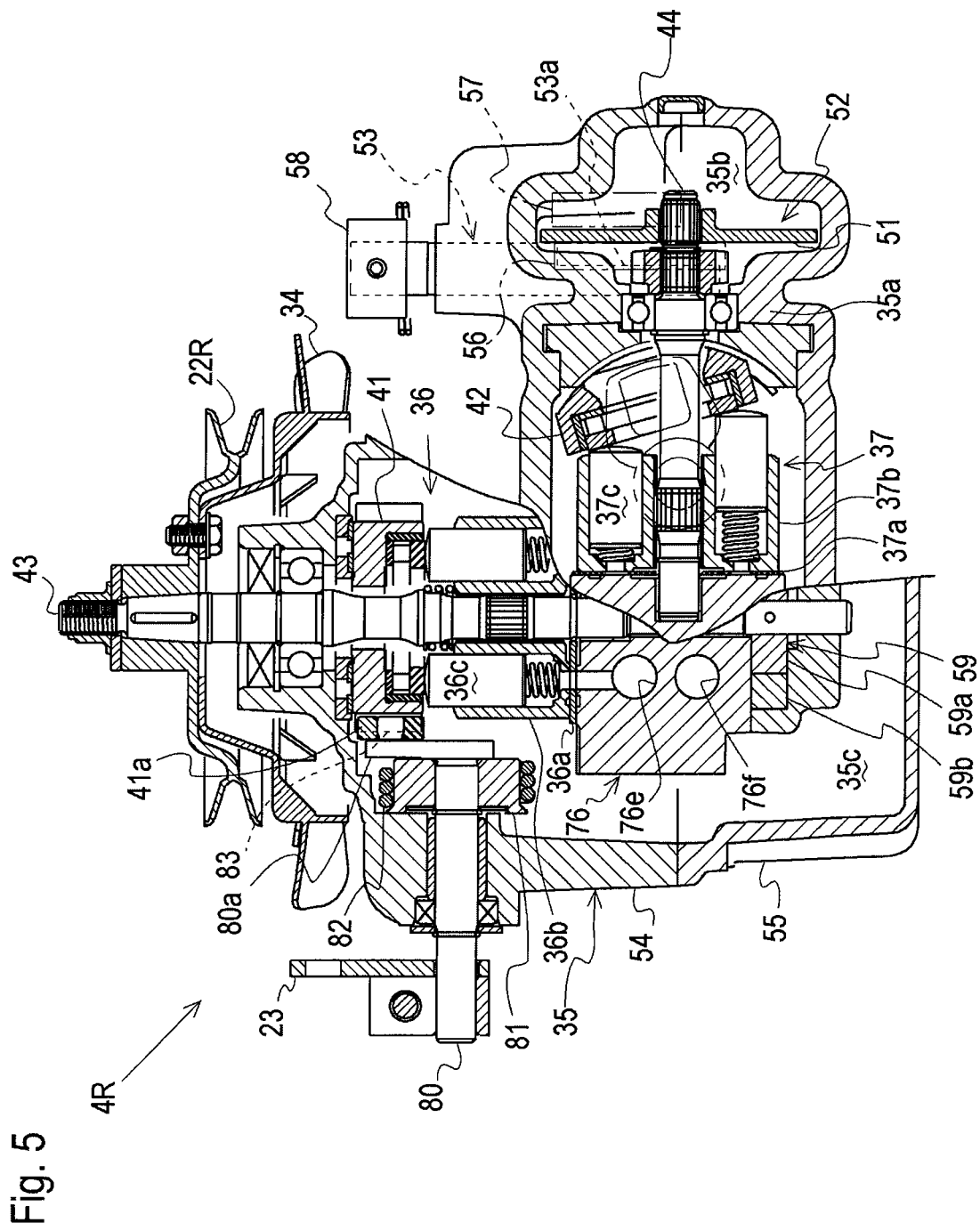
FIG. 5 is a cross sectional view taken along X-X line of FIG. 3.
Figure 6:
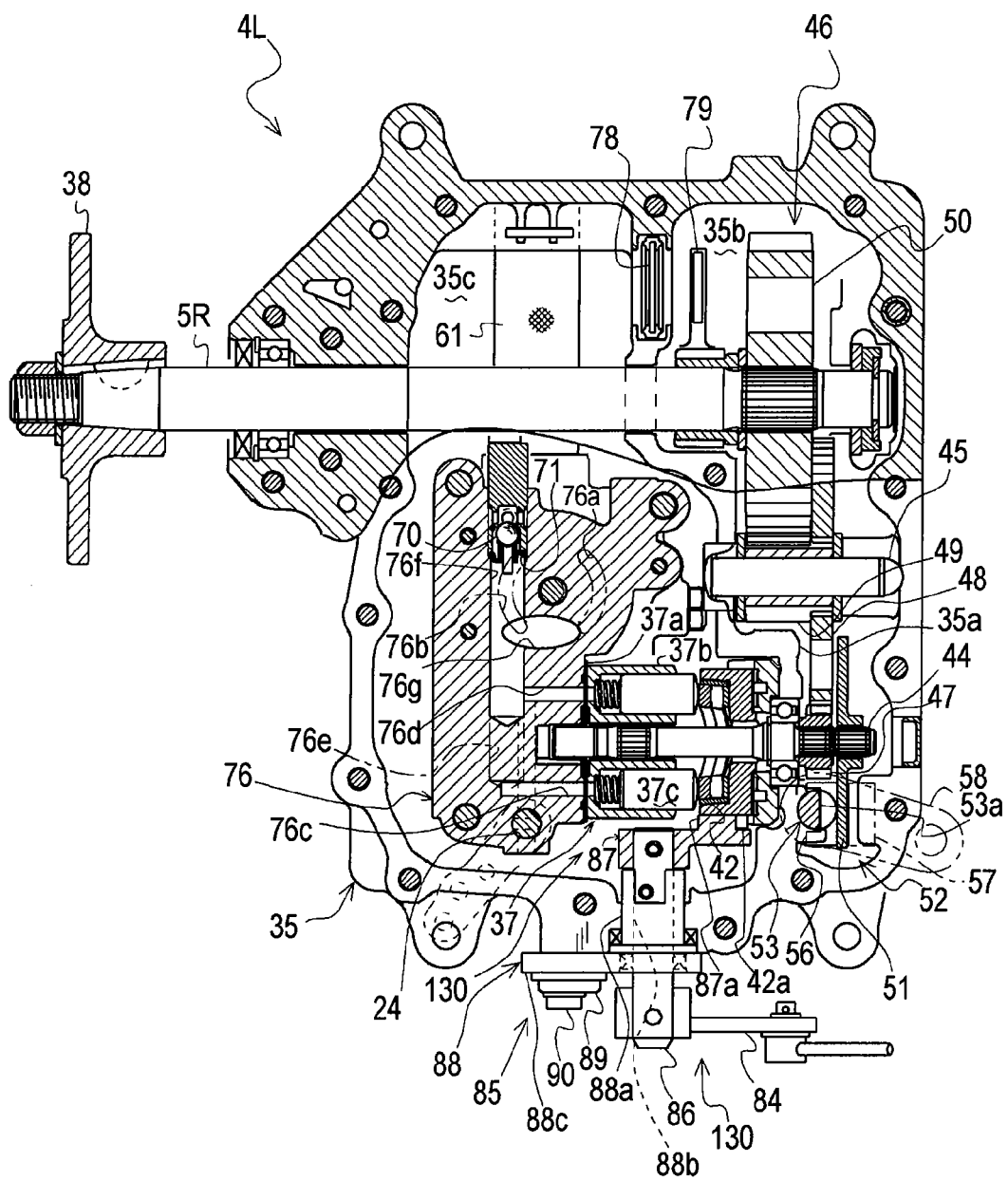
FIG. 6 is a sectional plan view of a left transaxle unit for the vehicle transaxle system.
Figure 7:
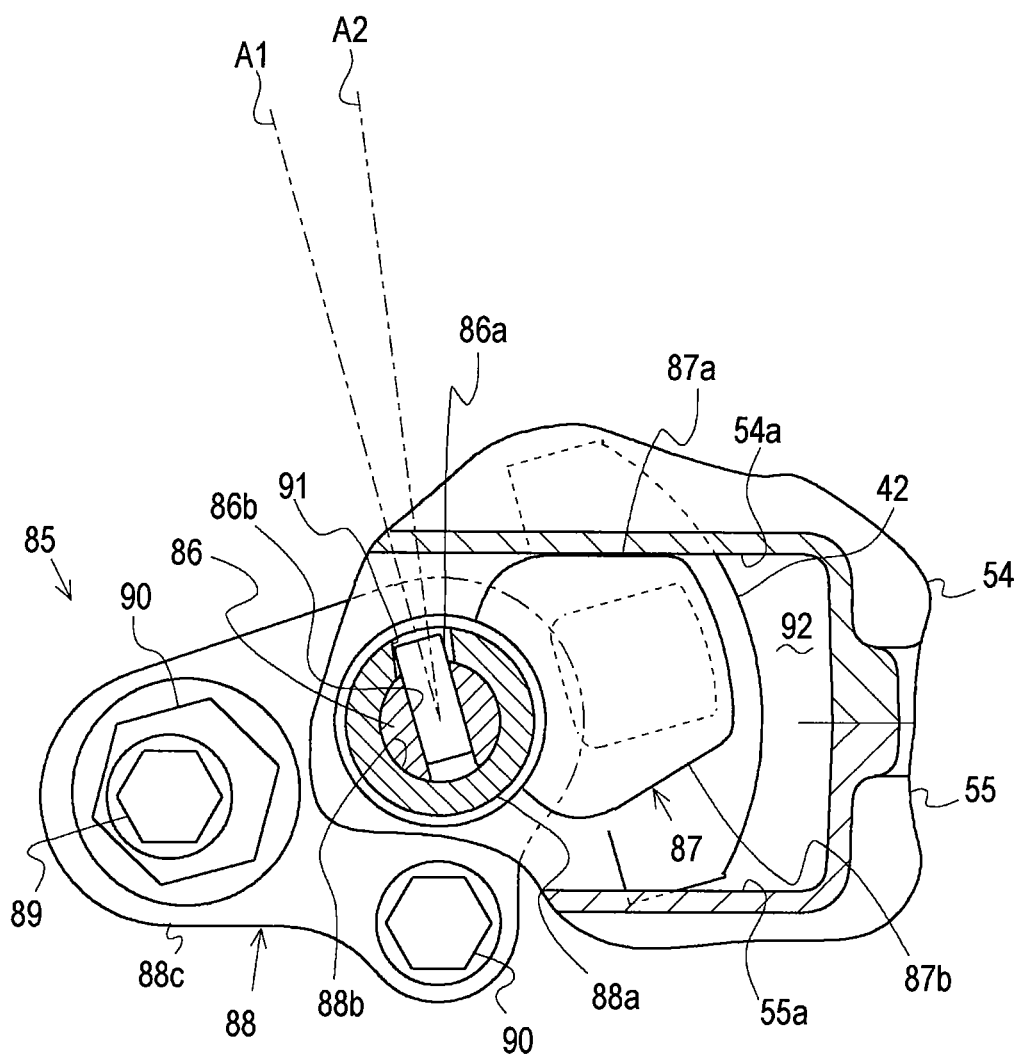
FIG. 7 is a fragmentary sectional front view of one of the right and left transaxle units showing a tilt angle adjusting mechanism for a hydraulic motor in the transaxle unit.
Figure 8:
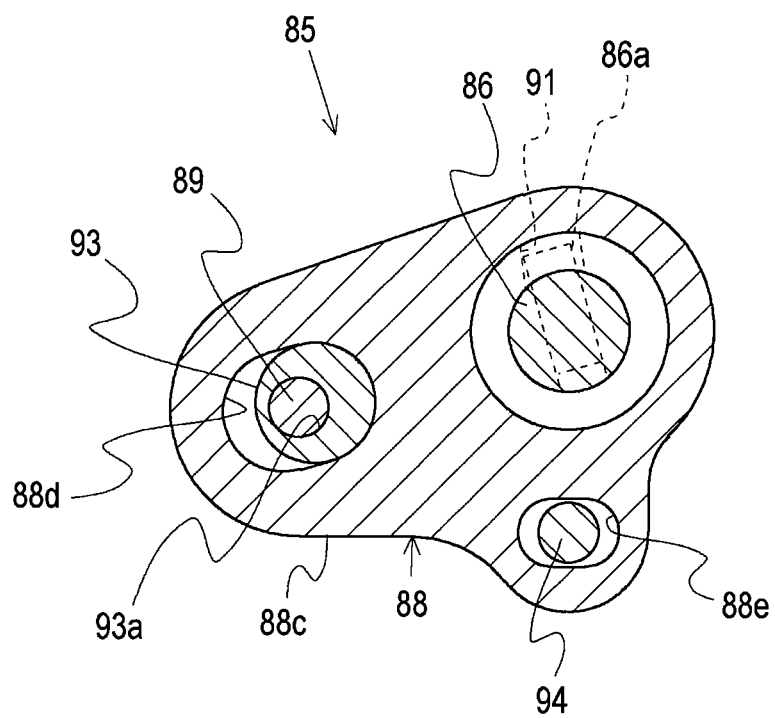
FIG. 8 is a front sectional view of a shaft holder for the tilt angle adjusting mechanism.

Right and left transaxle units 4R and 4L are laterally symmetric as shown in FIGS. 3 and 6. Referring to FIGS. 3 to 9, description will be given of representative right traveling unit 4R as description of both right and left traveling units 4R and 4L while description of left traveling unit 4L is omitted except for a different point of left traveling unit 4L from right traveling unit 4R.

Transaxle unit 4R includes a transaxle housing 35 constituted by joining an upper housing half 54 and a lower housing half 55 to each other through a horizontal joint surface. Right axle 5R is journalled in transaxle housing 35 and is extended rightwardly outward from a right end of transaxle housing 35 so as to be fixedly provided on a distal end thereof with a flange 38 to which right rear wheel 6R is fixed. Incidentally, as shown in FIG. 6, left axle 5L is extended leftwardly outward from a left end of transaxle housing 35 of left transaxle unit 4L and is fixedly provided on a distal end thereof with a flange 38 to which left right rear wheel 6L is fixed.

Axial piston type hydraulic pump 36 and motor 37 constituting HST 73 are disposed in transaxle housing 35. Alternatively, radial piston type hydraulic pump and motor may be provided as an HST. Hydraulic pump 36 is provided with movable swash plate 41 as mentioned above, and hydraulic motor 37 is also provided with a movable swash plate 42 serving as a movable motor displacement control member.

Movable swash plate 41 of hydraulic pump 36 of right transaxle unit 4R is moved by operating traveling control lever 12R so as to change the direction and amount of fluid delivery from hydraulic pump 36 to hydraulic motor 37, thereby steplessly changing the rotary speed and direction of rear wheel 6R, as mentioned above. On the other hand, movable swash plate 42 is switchable between a low speed position and a high speed position by shifting speed shift lever 26 between low speed position 102 and high speed position 103 so as to decide either a low-speed deceleration ratio or a high-speed deceleration ratio of HST 73 in addition to the control of the direction and amount of fluid delivery from hydraulic pump 36 to hydraulic motor 37 by tilting movable swash plate 41.

A center section 76 constituting HST 73 is disposed in transaxle housing 35, so as to have a horizontal upper surface serving as a pump mounting surface. Hydraulic pump 36 is mounted onto the pump mounting surface of center section 76 so as to have a vertical pump shaft 43 which projects upwardly outward from transaxle housing 35 so as to be fixedly provided thereon with input pulley 22R and cooling fan 34.

Center section 76 disposed in transaxle housing 35 has a vertical motor mounting surface onto which hydraulic motor 37 is mounted so as to have a horizontal motor shaft 44 parallel to axle 5R. A deceleration gear train 46 is disposed in transaxle housing 35 and is interposed between motor shaft 44 and axle 5R. Deceleration gear train 46 includes a counter shaft 45 extended parallel to motor shaft 44 and axle 5R, and includes gears 47, 48, 49 and 50.

A partition wall 35a is formed in the inside of transaxle housing 35 so as to divide an inner space of transaxle housing 35 into an HST chamber 35c and a gear chamber 35b. Fluid is filled in transaxle housing 35 so as to serve as fluid sumps 60 in HST chamber 35c and gear chamber 35b.

HST 73 including hydraulic pump 36 and motor 37 and center section 76 is disposed in HST chamber 35c so as to be submerged in fluid sump 60, and deceleration gear train 46 is disposed in gear chamber 35b. With regard to deceleration gear train 46, motor shaft 44 is journalled by partition wall 35a via a bearing and is extended from HST chamber 35c into gear chamber 35b, motor output gear 47 is fixed on motor shaft 44 in gear chamber 35b, diametrically large and small gears 48 and 49 are provided on counter shaft 45 so as to be rotatable integrally with each other, bull gear 50 is fixed on axle 5R, diametrically large gear 48 meshes with motor output gear 47, and diametrically small final pinion 49 meshes with bull gear 50.

In gear chamber 35b of transaxle housing 35, an axial end portion of motor shaft 44 is extended from motor output gear 47, and a brake rotor 51 is fixed on the end portion of motor shaft 44 so as to constitute a wet type brake mechanism 52 submerged in fluid sump 60 in gear chamber 35b. Brake mechanism 52 includes a vertical brake camshaft 53 disposed between brake rotor 51 and partition wall 35a. Brake camshaft 53 is rotatably supported by upper housing half 54. Brake camshaft 53 is formed to have a cam portion which is semicircular when sectionally viewed in plan and is disposed in transaxle housing 35. The cam portion of brake camshaft 53 has a vertical flat cam surface 53a which faces brake rotor 51. A brake shoe 56 is disposed between cam surface 53a and brake rotor 51. A brake pad 57 is disposed between brake rotor 51 and an inside surface of an outer wall of upper housing half 54.

A top portion of brake camshaft 53 projects upward from upper housing half 54 and is fixedly provided thereon with a brake arm 58. Brake arm 58 is rotatable together with brake camshaft 53 so as to be switched between a braking position and a non-braking position. When brake arm 58 is disposed at the non-braking position, cam surface 53a is extended parallel to a surface of brake shoe 56 facing cam surface 53a when viewed in plan, so as to allow rotation of brake rotor 51 and motor shaft 44 freely from brake shoe 56. When brake arm 58 is disposed at the braking position, cam surface 53a is slanted and a vertical edge thereof pushes brake shoe 56 against brake rotor 51, so that brake rotor 51 is pressed between brake shoe 56 and brake pad 57 and is braked together with motor shaft 44.

A bottom portion of center section 76 incorporates a charge pump 59 which is a torochoid pump including an inner gear 59a and an outer gear 59b surrounding inner gear 59a. Inner gear 59a is rotated together with pump shaft 43. A fluid filter 61 is extended from center section 76 in fluid sump 60 in HST chamber 35c. An external reservoir tank 62 is attached on an outside portion of transaxle housing 35 and is fluidly connected to fluid sump 60 in transaxle housing 35 via a siphon 63.

Transaxle housing 35 is formed with a pair of outlet port 64 and inlet port 65 that are opened outward from transaxle housing 35. As shown in FIG. 9, ports 64 and 65 of right transaxle unit 4R are connected to PTO clutch unit 30 via respective external fluid pipes 68a and 68b, and ports 64 and 65 of left transaxle unit 4L are connected via respective external fluid pipes 69a and 69b to a later-discussed hydraulic motor control valve 100 for controlling an interlocking connection means 66 connected to hydraulic motors 37 of right and left transaxle units 4R and 4L. In this way, PTO clutch unit 30 and hydraulic motor control valve 100, serving as external hydraulically-actuated implements, are supplied with fluid from respective transaxle housings 35 of right and left transaxles 4R and 4L via respective fluid-extraction pipes 68a and 69a, and return fluid to respective transaxle housings 35 via respective fluid-returning pipes 68b and 69b.

In each transaxle housing 35, an external-implement pressure regulation valve 67 is provided to regulate pressure of fluid flow from charge pump 59 to outlet port 64. In each of transaxle housings 35, center section 76 is formed therein with a pair of fluid passages 39 and 40 serving as a closed fluid circuit fluidly connecting hydraulic pump 36 and motor 37 mounted on center section 76 to each other, and inlet port 65 is adapted to be fluidly connected to fluid passages 39 and 40 through respective charge check valves 70. When one of fluid passages 39 and 40 is hydraulically depressed, corresponding charge check valve 70 is opened to supply fluid from inlet port 65 to hydraulically depressed fluid passage 39 or 40.

In each of transaxle housings 35, each of charge check valves 70 is bypassed by an orifice 71 which drains fluid from corresponding fluid passage 39 or 40 to fluid sump 60 or the other fluid passage 40 or 39 when corresponding fluid passage 39 or 40 is hydraulically pressurized higher than the other fluid passage 40 or 39, thereby expanding the neutral zone of HST 73 for stopping the fluid supply from pump 36 to motor 37 when the corresponding traveling control lever 12R or 12L is set to the neutral position, and thereby surely stopping rotation of axle 5R or 5L.

Further, HST 73 is provided with a bypass valve 74. Bypass valve 74 is normally closed as shown in FIG. 9. When vehicle 1 is towed, an operator opens bypass valve 74 so as to drain fluid from fluid passages 39 and 40 to fluid sump 60 so as to enable hydraulic motor 37 and corresponding axle 5R or 5L to rotate freely from the hydraulic pressure of HST 73.

Further, each HST 73 is provided with a check valve serving as a free wheel prevention valve 75. When vehicle 1 is parked on a slope and fluid leaks from the closed fluid circuit, charge pump 59 cannot supply fluid to the closed fluid circuit because prime mover 9 is stationary. However, free wheel valve 75 is naturally opened by the hydraulic depression of the closed fluid circuit so as to supply fluid from fluid sump 60 to an intermediate portion of a fluid passage between inlet port 65 and charge check valves 70, thereby keeping the hydraulic pressure of the closed fluid circuit that is surely applied as a dynamic brake to hydraulic motor 37 and corresponding axle 5R or 5L, and thereby preventing corresponding rear wheel 6R or 6L from unexpectedly rotating to cause vehicle 1 to descend the slope.

Figure 4:
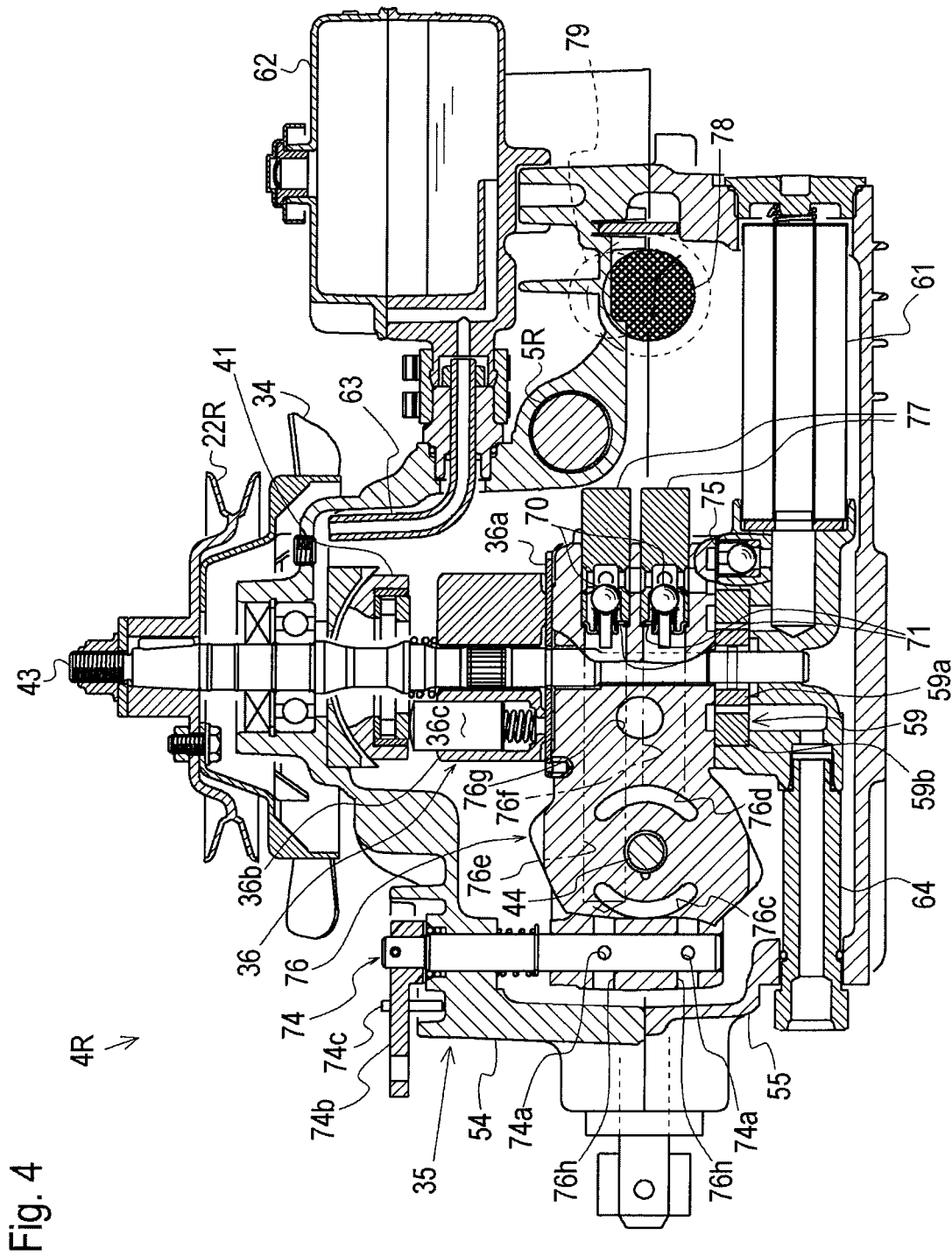
FIG. 4 is a sectional side view of the transaxle unit.

Referring to FIGS. 3 and 4, HST 73 in representative right transaxle unit 4R will be described in detail. A pair of kidney ports 76a and 76b are opened at the pump mounting surface of center section 76, and a pair of kidney ports 76c and 76d are opened at the motor mounting surface of center section 76. An upper fluid hole 76e and a lower fluid hole 76f are formed parallel to each other in center section 76 so as to extend horizontally in the fore-and-aft direction of vehicle 1 and to be juxtaposed on a vertical phantom surface. Upper fluid hole 76e is opened at a front portion thereof to kidney port 76b and is opened at a rear end thereof to kidney port 76c so as to serve as fluid passage 39 between hydraulic pump 36 and motor 37. A vertically slanted fluid hole 76g is formed in center section 76 and is extended upwardly slantwise from a front portion of lower fluid hole 76f so as to be opened to kidney port 76a, and lower fluid hole 76f is opened at a rear end thereof to kidney port 76d, so that fluid holes 76f and 76g serve as fluid passage 40 between hydraulic pump 36 and motor 37.

Fluid holes 76e and 76f are extended forward and are opened at front ends thereof outward from center section 76. A pair of charge check valve casings 77 are fitted into the respective open ends of fluid holes 76e and 76f. Each of charge check valve casings 77 incorporates charge check valve 70 and is formed therein with orifice 71 bypassing charge check valve 70.

A pair of upper and lower bypass fluid holes 76h are formed in center section 76, are extended from respective upper and lower fluid holes 76e and 76f, and are opened outward from center section 76 at the rear end of center section 76. A vertically axial rotary valve serving as bypass valve 74 is rotatably fitted in a rear portion of center section 76 so as to intersect upper and lower bypass fluid holes 76h. Bypass valve 74 is formed therein with upper and lower diametrical holes 74a corresponding to respective upper and lower bypass fluid holes 76h. A top portion of bypass valve 74 projects upward from upper housing half 54 and is fixedly provided thereon with a bypass arm 74b that are rotatable together with bypass valve 74 to be switched between a closed valve position and an opened valve position defined by respective steps formed on an upper surface of upper housing half 54. A stopper 54c projects from bypass arm 54b so as to be adapted to contact one of the steps defining the respective valve positions. Bypass arm 74b is normally set at the closed valve position so as to close bypass valve 74, as shown in FIG. 4, so that holes 74a are isolated from respective bypass fluid holes 76h. When vehicle 1 is towed, an operator rotates bypass arm 74b to the opened valve position so as to open bypass valve 74 so that holes 74a are opened to respective bypass fluid holes 76h to drain fluid from the closed fluid circuit in center section 76 to fluid sump 60.

Hydraulic pump 36 includes a valve plate 36a, a cylinder block 36b, pistons 36c, pump shaft 43 and movable swash plate 41. Valve plate 36a is fixed onto the pump mounting surface of center section 76. Cylinder block 36b is slidably rotatably fitted on valve plate 36a. Pump shaft 43 is fixed to cylinder block 36b and is extended on the center axis of cylinder block 36b. Pump shaft 43 is relatively rotatably passed through valve plate 36a, is relatively rotatably inserted into center section 76, and is fixed to inner gear 59a of charge pump 59 so as to serve as a drive shaft of charge pump 59. Pistons 36c are vertically reciprocally fitted into cylinder block 36b and are arranged at regular intervals around pump shaft 43.

Cradle type movable swash plate 41 is slidably rotatable fitted to an arcuate ceiling of upper housing half 54 and has a thrust bearing abutting against heads of pistons 36c. Pump shaft 43 is freely rotatably passed through movable swash plate 41, is journalled by a top portion of upper housing half 54 via bearings, and projects upwardly outward from the top portion of upper housing half 54. A horizontal pump control shaft 80 parallel to axle 5R is rotatably supported by upper housing half 54.

Outside transaxle housing 35 (with respect to right transaxle unit 4R, on a right outside of transaxle housing 35), a pump control arm 23 is fixed on an outer end of pump control shaft 80. A reel member 81 is fixed on an inner end portion of pump control shaft 80 inside housing 35. Inside transaxle housing 35, pump control shaft 80 is integrally formed at an inner end thereof with an inner arm 80a, and inner arm 80a is fitted into a recess 41a formed on movable swash plate 41 via an engaging member 83. A neutral returning spring 82 is wound around reel member 81 so as to bias pump control shaft 80, pump control arm 23 and movable swash plate 41 toward their neutral positions.

Hydraulic motor 37 includes a valve plate 37a fixed to the motor mounting surface of center section 76, a cylinder block 37b slidably rotatably fitted to valve plate 37a, pistons 37c laterally horizontally reciprocally fitted into cylinder block 37b, motor shaft 44 fixed to cylinder block 37b and defined as the center axis of cylinder block 37b, and cradle type movable swash plate 42 having a thrust bearing abutting against pistons 37c, and is configured similar to hydraulic pump 36.

Movable swash plate 42 is slidably rotatably fitted to upper and lower housing halves 54 and 55. A retainer (not shown) guiding the tilt of movable swash plate 42 is shaped vertically symmetric so that the rotary direction of motor shaft 44 relative to the rotary direction of pump shaft 43 can be reversed by vertically reversing the retainer while keeping the operative rotation direction of pump control arm 23. In other words, the retainer is configured to select whether the slant direction of the thrust bearing of movable swash plate 42 is upward or downward from the horizontal axis of motor shaft 44.

Referring to FIG. 5, motor shaft 44 is disposed at the center axis thereof on the horizontal joint surface between upper and lower housing halves 54 and 55. Motor shaft 44 is extended from cylinder block 37b opposite to center section 76 so as to freely rotatably pass through movable swash plate 42, and projects into gear chamber 35b so as to be provided with wet type brake mechanism 52 in gear chamber 35b as mentioned above. Motor shaft 44 is further extended from cylinder block 37b into center section 76 opposite to movable swash plate 42 and is journalled at an end portion thereof by center section 76.

Referring to FIGS. 3 and 5 to 8, description will be given of a tilt angle adjusting mechanism 85 for adjusting the tilt angle of movable swash plate 42 of hydraulic motor 37 in each of transaxle units 4R and 4L.

Hydraulic motor 37 is provided with a horizontal motor control shaft 86 having a center axis disposed on the horizontal joint surface between upper and lower housing halves 54 and 55 and rotatably supported by upper and lower housing halves 54 and 55 via a later-discussed shaft holder 88. An inner arm 87 is connected to an inner end of motor control shaft 86 inside transaxle housing 35, and is formed on a side end thereof with an engaging portion 87a. Movable swash plate 42 is formed with an engaging portion 42a to engage with engaging portion 87a of inner arm 87. Movable swash plate 42, inner arm 87 and motor control shaft 86 are defined as a movable motor displacement control member 130 of each of hydraulic motors 37 for selectively setting the displacement of hydraulic motor 37 to either a predetermined large displacement or a predetermined small displacement. Outside transaxle housing 35, a motor control arm 84 is fixed on an outer end of motor control shaft 86.

Tilt angle adjusting mechanism 85 includes shaft holder 88 provided on a rear surface of transaxle housing 35 so as to hold motor control shaft 86. Shaft holder 88 is formed integrally with a plate portion 88c and a boss portion 88a extended from plate portion 88c, and a boss hole 88b penetrates boss portion 88a. Plate portion 88c is disposed outside transaxle housing 35 and is fastened to transaxle housing 35 by bolts 89 and 90 with nuts. Boss portion 88a is fitted into an outwardly opened hole of transaxle housing 35. Motor control shaft 86 is rotatably passed through boss hole 88b in boss portion 88a fitted to transaxle housing 35. To adjust an angle of boss portion 88a relative to motor control shaft 86, bolts 89 and 90 are loosened and plate portion 88c is rotated around bolt 89.

Boss portion 88a is formed with a notch 91 extended substantially radially from the center axis of boss hole 88b. A pin 86a is fitted into a pin hole 86b formed in motor control shaft 86, and projects outward from pin hole 86b so as to be inserted into notch 91. Notch 91 has a width such as to allow only rotation of pin 86a between a position A1 and a position A2, thereby determining the tilt angle range of movable swash plate 42.

When pin 86a abuts against one end of notch 91 defined as position A1, movable swash plate 42 is disposed at a tilt angle for realizing a maximum displacement of hydraulic motor 37. That is, position A1 is defined as a low speed position of motor control shaft 86 for realizing a low rotary speed level of motor shaft 44. When pin 86a abuts against the other end of notch 91 defined as position A2, movable swash plate 42 is disposed at a tilt angle for realizing a minimum displacement of hydraulic motor 37. That is, position A2 is defined as a high speed position of motor control shaft 86 for realizing a high rotary speed level of motor shaft 44.

Further, the relative angle of boss portion 88a to motor control shaft 86 therethrough can be changed to adjust the maximum and minimum displacements of hydraulic motor 37. In this regard, plate portion 88c of shaft holder 88 is formed with a first slot 88d, and a bush 93 is inserted into first slot 88d. An eccentric axial hole 93a penetrates bush 93, and bolt 89 is passed through hole 93a and is screwed into transaxle housing 35. When bolt 89 is loosened, bush 93 becomes rotatable around bolt 89, and the rotation of bush 93 centered on bolt 89 adjusts the angle of boss 88a centered on motor control shaft 86.

A second slot 88e is formed in plate portion 88c of shaft holder 88. A bolt 94 is passed through second slot 88e, and is screwed into transaxle housing 35, so as to fasten plate portion 88c to transaxle housing 35 after the above-mentioned adjustment of the angle of boss 88a relative to motor control shaft 86. In this way, right and left transaxle units 4R and 4L are provided with respective hydraulic motors 37 having respective minutely adjustable minimum and maximum displacements regardless of assembling deviation of hydraulic motors 37 when assembled into respective transaxle units 4R and 4L, thereby ensuring the straight traveling performance of vehicle 1.

Incidentally, hydraulic motor 37 may be provided with a detent mechanism for retaining motor control shaft 86 at either low speed position A1 or high speed position A2. The detent mechanism may be a ball-type having a detent ball and a spring for pressing the detent ball. The detent mechanism may be interposed between boss portion 88a and motor control shaft 86. Alternatively, hydraulic motor 37 may be provided with a means for retaining motor control shaft 86 at an optional position between low speed position A1 and high speed position A2 by a frictional force or the like, so that another middle speed level of motor shaft 44 may be set in addition to the low speed level and the high speed level.

Referring to FIGS. 1, 3 and 9-12, description will be given of some interlocking connection means, each of which interlockingly connects movable motor displacement members 130 of respective hydraulic motors 37 of right and left transaxle units 4R and 4L to speed shift lever 26 so as to be operated to synchronously operate both movable motor displacement members 130 by operating speed shift lever 26.

Figure 10:
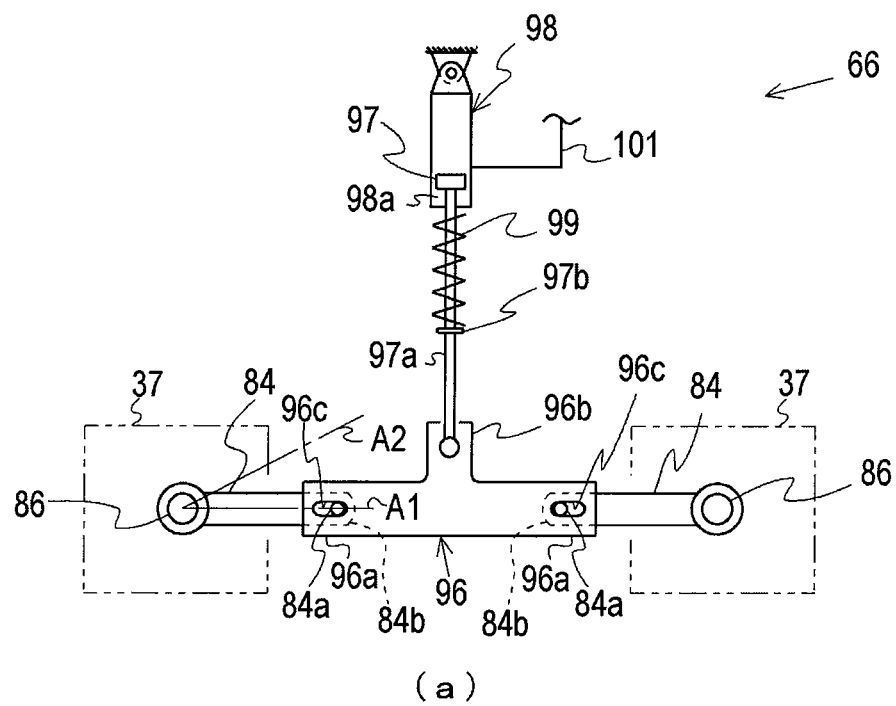
FIG. 10(a) is a diagram of a first interlocking connection means when setting hydraulic motors in a low speed mode.
FIG. 10(b) is a diagram of the first interlocking connection means when setting the hydraulic motors in a high speed mode.
Figure 10:
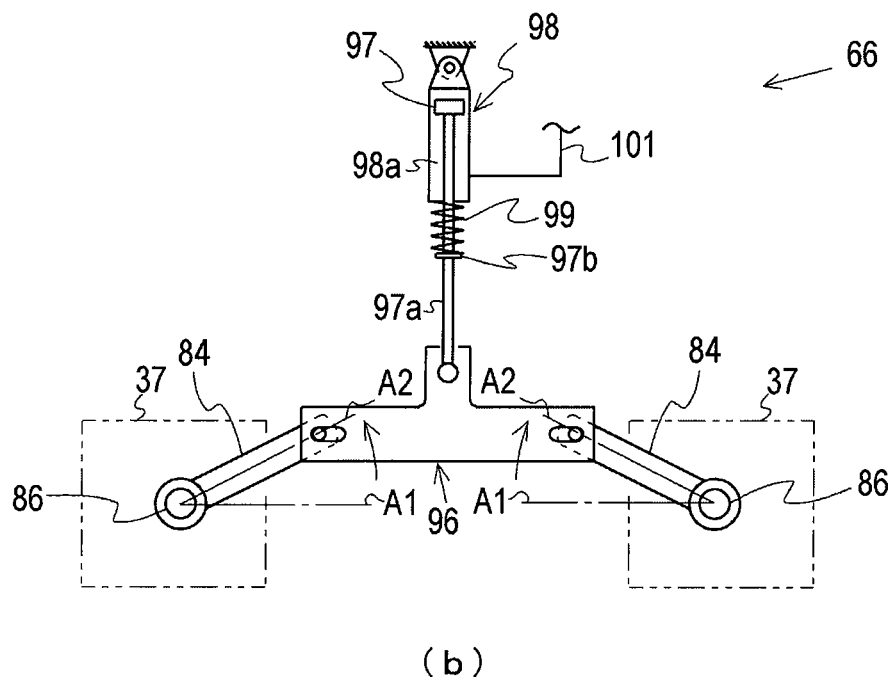

Referring to FIGS. 10(*a*) and 10(*b*), an interlocking connecting means 66 includes a T-shaped connection stay 96 (serving as a mechanical connection member) and a hydraulic cylinder 98 with a piston 97 therein (serving as a push-pull type actuator). Right and left motor control arms 84 (serving as a pair of operation members) of respective hydraulic motors 37 of right and left transaxle units 4R and 4L are disposed on a common surface, and are connected at respective tips thereof to respective opposite right and left end portions 96a of connection stay 96 placed on the surface. Connection stay 96 has a bar extended between opposite end portions 96a and has an end portion 96b extended from an intermediate portion of the bar perpendicular to the bar. Piston 97 is fluid-tightly and slidably fitted in cylinder 98. A piston rod 97a is extended from piston 97 and outward from cylinder 98, and is connected at a tip thereof to end portion 96b of connection stay 96. Cylinder 98 is pivoted at a bottom end thereof onto vehicle body frame 24.

Right and left motor control arms 84 are formed with respective pins 84a. Right and left end portions 96a of connection stay 96 are formed therein with respective slots 96c extended in the longitudinal direction of the bar of connection stay 96. Pins 84a of respective right and left motor control arms 84 are slidably fitted in slots 96c in respective right and left end portions 96a of connection stay 96, thereby allowing motor control arms 84 to rotate relative to connection stay 96. More specifically, the laterally symmetric arrangement of right and left motor control arms 84 is kept regardless of movement of connection stay 96 according to the telescopic movement of piston rod 97a relative to cylinder 98.

A spring retainer 97c is formed on an axial intermediate portion of piston rod 97a, and a spring 99 is wound around piston rod 97a between cylinder 98 and spring retainer 97c so as to bias piston rod 97a toward end portion 96b of connection stay 96, so that piston rod 97a is biased to extend outward from cylinder 98. Cylinder 98 is a single action type cylinder having a fluid chamber 98a on one axial side of piston 97 with piston rod 97a. Cylinder 98 is provided with a port opened to fluid chamber 98a, and as shown in FIG. 9, this port is connected to hydraulic motor control valve 100 via a fluid passage 101, and hydraulic motor control valve 100 is fluidly connected to outlet and inlet ports 64 and 65 of transaxle housing 35 of one transaxle unit 4R or 4L (in this embodiment, left transaxle unit 4L) as mentioned above.

Hydraulic motor control valve 100 is a solenoid valve electrically controlled via a later-discussed electric circuit 104 (see FIG. 13) based on sensing a position of speed shift lever 26. When speed shift lever 26 is set at low speed position 102, hydraulic motor control valve 100 is disposed at a low speed position M1 so as to stop the fluid supply to fluid chamber 98a. At this time, due to the force of spring 99, piston rod 97a is extended outward from cylinder 98 and connection stay 96 is located at a low speed position shown in FIG. 10(*a*), wherein, in this embodiment, both motor control arms 84 are linearly aligned with the bar of connection stay 96, thereby retaining motor control shafts 86 at respective low speed positions A1 that have been predetermined by respective tilt angle adjusting mechanisms 85. Therefore, the maximum displacements of hydraulic motors 37 are set so as to realize the low rotary speed levels of motor shafts 44.

When speed shift lever 26 is set at a high speed position 103, hydraulic motor control valve 100 is disposed at a high speed position M2 so as to supply fluid to fluid chamber 98a. At this time, piston rod 97a is withdrawn into cylinder 98 against spring 99 so that connection stay 96 is located at a high speed position shown in FIG. 10(*b*), wherein, in this embodiment, motor control arms 84 are rotated to have angles from the bar of connection stay 96, thereby retaining motor control shafts 86 at respective high speed positions A2. Therefore, the minimum displacements of hydraulic motors 37 are set so as to realize the high rotary speed levels of motor shafts 44.

Incidentally, hereinafter, low speed position A1 of motor control shaft 86 is also defined as low speed position A1 of motor control arm 84, and low speed position A1 of motor control shaft 86 is also defined as low speed position A1 of motor control arm 84. The positions of motor control arms 84 defined as low speed position A1 and high speed positions A2 are not limited to those shown in FIGS. 10(*a*) and 10(*b*).

Figure 11:
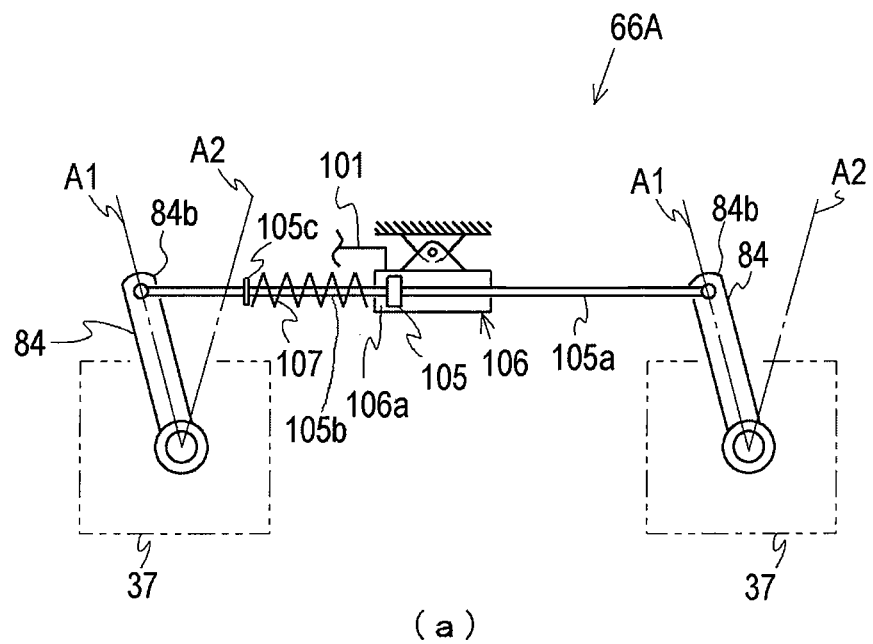
FIG. 11(a) is a diagram of a second interlocking connection means when setting the hydraulic motors in the low speed mode.
FIG. 11(b) is a diagram of the second interlocking connection means when setting the hydraulic motors in the high speed mode.
Figure 11:
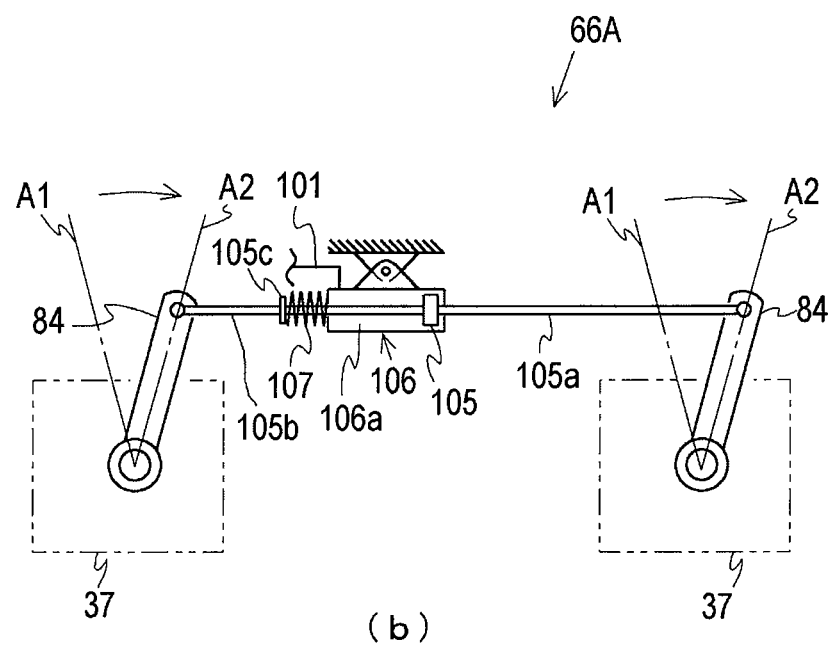

Referring to FIGS. 11(*a*) and 11(*b*), an alternative interlocking connection means 66A is configured to keep a parallel arrangement of motor control arms 84 in comparison with interlocking connection means 66 configured to keep the symmetric arrangement of motor control arms 84. In this regard, interlocking connection means 66A includes a hydraulic cylinder 106 serving as a push-pull type actuator, and piston rods 105a and 105b extended from cylinder 106 are directly connected to motor control arms 84 disposed parallel to each other. Alternatively, motor control arms 84 may not be parallel, and may be rotated to keep a certain relative angle therebetween. In this way, piston rods 105a and 105b serve as the mechanical connection member by themselves, so that interlocking connection means 66A uses no additional mechanical connection member like connection stay 96, interposed between piston rods 105a and 105b and motor control arms 84, thereby reducing the number of parts, costs, and labor for maintenance.

Further, interlocking connection means 66A is based on that right and left motor control shafts 86 are adapted to rotate in the same direction so as to be shifted from respective low speed positions A1 to respective high speed positions A2, while interlocking connection means 66 is based on that right and left motor control shafts 86 are adapted to rotate in opposite directions so as to be shifted from respective low speed positions A1 to respective high speed positions A2. The tilt directions of movable swash plates 42 of hydraulic motors 37 relative to the axes of respective motor shafts 44 must be determined in consideration of the rotary directions of respective motor control shafts 86 while movable swash plates 41 of hydraulic pumps 36 are set to rotate motor shafts 44 in the same direction. Therefore, as mentioned above, each of the retainers of movable swash plates 42 is configured to selectively set movable swash plate 42 in either the upwardly slant direction or the downwardly slant direction.

With regard to interlocking connection means 66A, a piston 105 is fluid-tightly and slidably fitted in cylinder 106, coaxially opposite right and left piston rods 105a and 105b are extended from piston 105 and oppositely outward from cylinder 106 so as to be connected at respective tips thereof to the tips of respective motor control arms 84. A spring retainer 105c is formed on an axial intermediate portion of one of piston rods 105a and 105b (in this embodiment, left piston rod 105b), and a spring 107 is wound around piston rod 105b between cylinder 106 and spring retainer 105c so as to bias piston rods 105a and 105b in one direction (in this embodiment, leftward), thereby biasing motor control shafts 86 and motor control arms 84 toward respective low speed positions A1. Cylinder 106 is a single action type cylinder having a fluid chamber 106a on one axial side of piston 105 (in this embodiment, on the left side of piston 105 with left piston rod 105b). Cylinder 106 is provided with a port opened to fluid chamber 106a. Cylinder 106 corresponds to cylinder 98 shown in FIG. 9, and the port opened to fluid chamber 106a is connected to hydraulic motor control valve 100 via fluid passage 101, similar to the port of cylinder 98 as mentioned above.

Therefore, when speed shift lever 26 is set at low speed position 102, hydraulic motor control valve 100 is disposed at low speed position M1 so as to stop the fluid supply to fluid chamber 106a, so that, due to the force of spring 107, piston rods 105a and 105b retain motor control arms 84 and shafts 86 at respective low speed positions A1 for setting the maximum displacements of hydraulic motors 37, as shown in FIG. 11(a). When speed shift lever 26 is set at a high speed position 103, hydraulic motor control valve 100 is disposed at high speed position M2 so as to supply fluid to fluid chamber 106a, so that piston rods 105a and 105b move against spring 107 to set motor control arms 84 and shafts 86 at respective high speed positions A2 for setting the minimum displacements of hydraulic motors 37, as show in FIG. 11(b).

Figure 12:
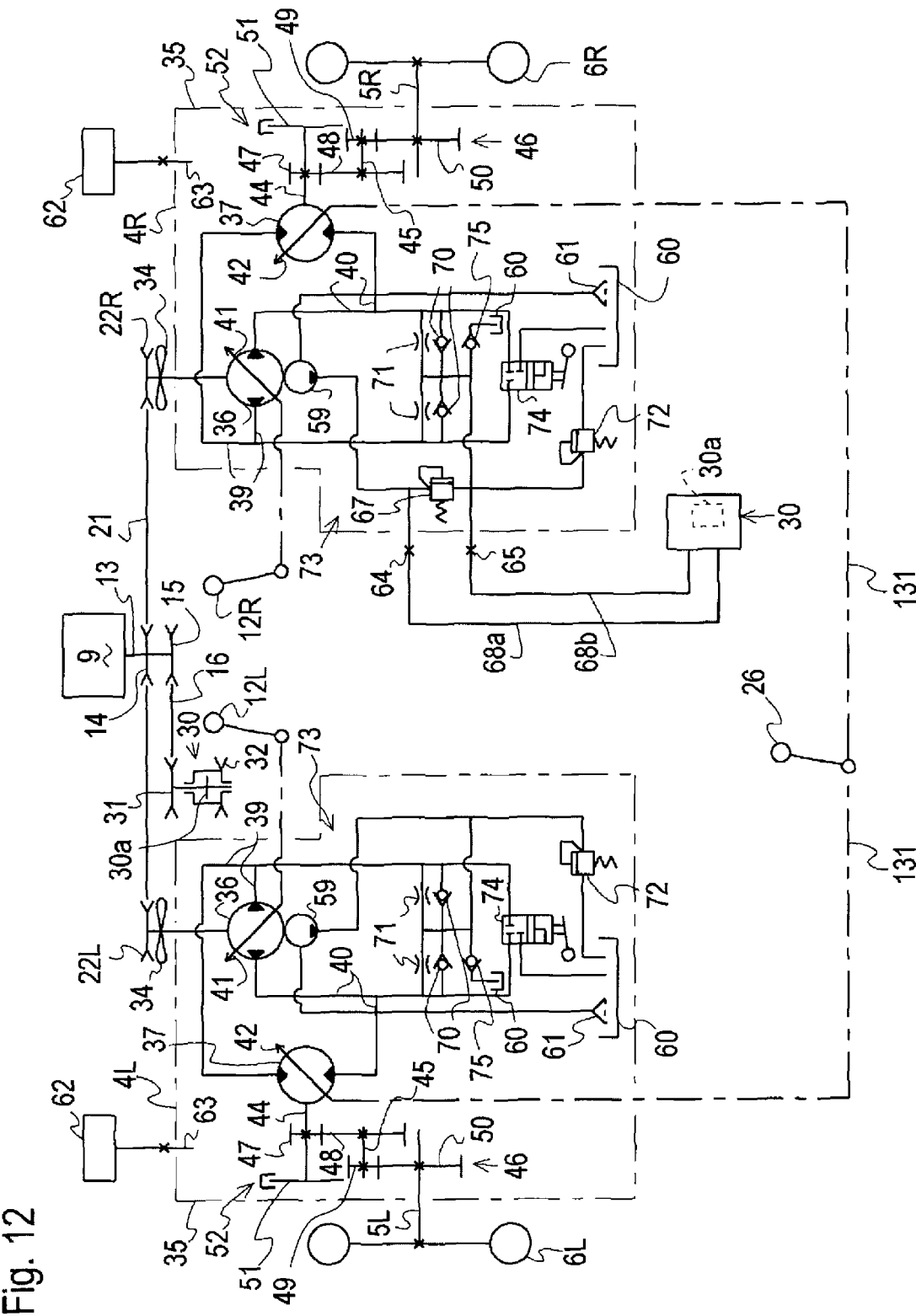
FIG. 12 is a diagram of an alternative hydraulic circuit of the vehicle transaxle system.

Each of interlocking connection means 66 and 66A uses hydraulic and electric control elements as mentioned above. Alternatively, as shown in FIG. 12, speed shift lever 26 may be connected via simple mechanical connection members 131, such as wires, to movable swash plates 42 of hydraulic motors 37. Such a simple connection of speed shift lever 26 to movable swash plates 42 of hydraulic motors 37 is advantageous in economizing and minimizing vehicle 1.

Figure 13:
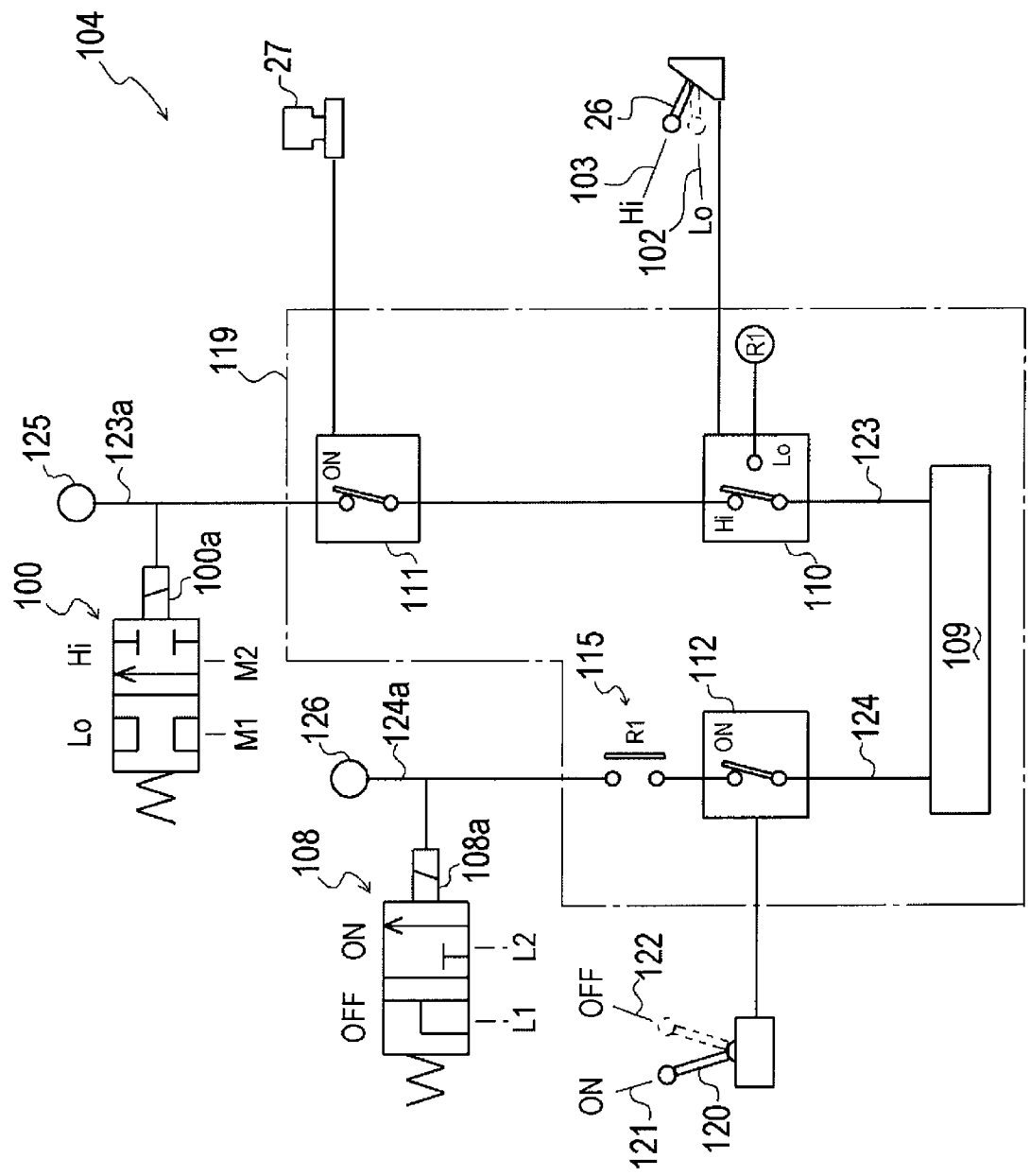
FIG. 13 is a diagram of electric circuits for controlling the vehicle transaxle system, the electric circuits being provided with some checking elements with regard to change of a speed mode of the hydraulic motors.

Referring to FIGS. 9 and 13-17, description will be described of embodiments about traveling-mode control and PTO-clutch control by use of interlocking connection means 66 or 66A. As shown in FIG. 13, a controller 119 is provided for the traveling control and the PTO clutch control. Vehicle 1 is provided with safety control key 27 and speed shift lever 26 as mentioned above, and with a PTO clutch lever 120 for operating PTO clutch 30a. Controller 119 include switches 111, 110 and 112. Switch 111 serves as the above-mentioned key switch having the key slot for safety control key 27. Switch 110 is connected to speed shift lever 26, and switch 112 is connected to PTO clutch lever 120. In this way, switches 111, 110 and 112 are switchable according to operation of respective operation devices 27, 26 and 120. Further, controller 119 includes an "a"-contact type relay 115, and an electric power source 109 such as a battery.

Further, a wire 123 is extended from electric power source 109 to a solenoid 100a of hydraulic motor control valve 100, and a wire 124 is extended from electric power source 109 to a solenoid 108a of PTO clutch valve 108, so as to constitute an electric circuit 104 including wires 123 and 124.

In electric circuit 104, switch 111 serving as the key switch for safety control key 27 and switch 110 connected to speed shift lever 26 are provided in series on wire 123 between electric power source 109 and solenoid 100a. Switch 110 is switched to a high speed position Hi (i.e., switch 110 is closed to establish the continuity of wire 123) by setting speed shift lever 26 at high speed position 103, and is switched to a low speed position Lo (i.e., is opened to interrupt the continuity of wire 123) by setting speed shift lever 26 at low speed position 102. Switch 111 is switched on (i.e., is closed to establish the continuity of wire 123) by inserting safety control key 27 into a key slot. Switch 111 is switched off (i.e., is opened to interrupt the continuity of wire 123) by drawing safety control key 27 out of the key slot. Further, a high speed alarm lamp 125 is electrically connected to wire 123 between switch 110 and solenoid 100a via a branching wire 123a.

Figure 14:
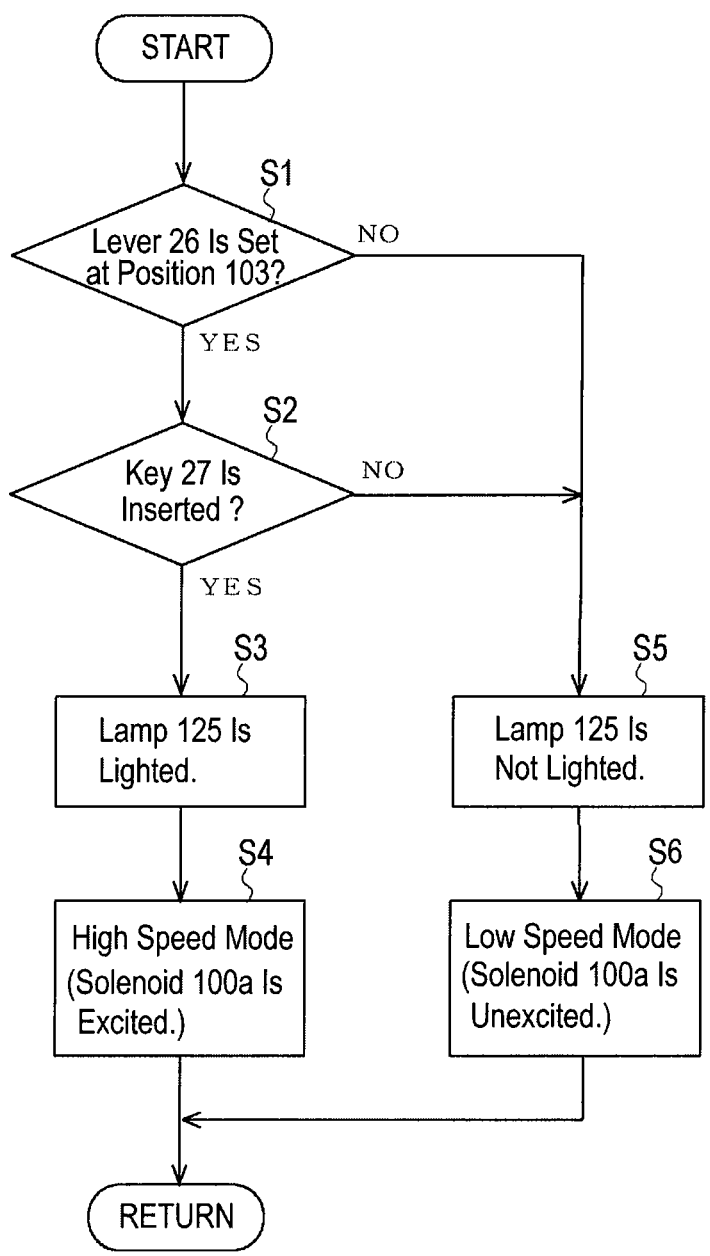
FIG. 14 is a flow chart for limiting the speed mode of the hydraulic motors by use of the electric circuit of FIG. 13.

In this regard, referring to a flow chart shown in FIG. 14, at first, it is judged whether or not speed shift lever 26 is set at high speed position 103 by judging whether switch 110 is set at high speed position Hi or low speed position Lo (Step S1). When switch 110 is set at high speed position Hi by setting speed shift lever 26 at high speed position 103 (Step S1, Yes), it is judged whether or not safety control key 27 is inserted into the key slot by judging whether switch 111 is switched on or off (Step S2). When switch 111 is switched on by inserting safety control key 27 into the key slot (Step S2, Yes), the continuity of wire 123 from electric power source 109 to solenoid 100a and high speed alarm lamp 125 is completed via closed switches 110 and 111, so that high speed alarm lamp 125 is lighted (Step S3), and simultaneously, solenoid 100a is excited to set hydraulic motor control valve 100 at high speed position M2 for supplying fluid to cylinder 98 (or 106) of interlocking connecting means 66 (or 66A) so as to set hydraulic motors 37 in a high speed mode (Step S4), where motor control arms 84 and shafts 86 are set at respective high speed positions A2. Then, the rotary directions and speeds of right and left axles 5R and 5L (i.e., wheels 6R and 6L) are controlled by operating right and left traveling control levers 12R and 12L while hydraulic motors 37 of right and left transaxle units 4R and 4L are set in the high speed mode.

In this way, hydraulic motors 37 are set in the high speed mode only when speed shift lever 26 is set at high speed position 103 and safety control key 27 is inserted into the key slot. Otherwise, i.e., if speed shift lever 26 is set at low speed position 102 to set switch 110 at low speed position Lo (Step S1, No), or if speed shift lever 26 is set at high speed position 103 to set switch 110 at high speed position Hi (Step S1, Yes) and safety control key 27 is removed from the key slot to open switch 111 (Step S2, No), the continuity of wire 123 is interrupted, so that high speed alarm lamp 125 is not lighted (Step S5), and solenoid 100a is unexcited to set hydraulic motor control valve 100 at low speed position M1 for stopping the fluid supply to cylinder 98 (or 106) of interlocking connecting means 66 (or 66A), whereby hydraulic motors 37 are set in a low speed mode (Step S6) so that motor control arms 84 and shafts 86 are set at respective low speed positions A1. Then, the rotary directions and speeds of right and left axles 5R and 5L (i.e., wheels 6R and 6L) are controlled by operating right and left traveling control levers 12R and 12L while hydraulic motors 37 of right and left transaxle units 4R and 4L are set in the low speed mode.

As an effect of this traveling mode control, even if an operator is unaccustomed to traveling speed control operation of vehicle 1 and wrongly shifts speed shift lever 26 to high speed position 103, hydraulic motors 37 are safely kept in the low speed mode unless safety control key 27 is inserted into the key slot.

In electric circuit 104, switch 112 connected to PTO clutch lever 120 and relay 115 are provided in series on wire 124 between electric power source 109 and solenoid 108a. Switch 112 is switched on (i.e., switch 112 is closed to establish the continuity of wire 124) by setting PTO clutch lever 120 at a clutch-on position 121, and is switched off (i.e., switch 112 is opened to interrupt the continuity of wire 124) by setting PTO clutch lever 120 at a clutch-off position 122. When switch 111 is set at low speed position Lo by setting speed shift lever 26 at low speed position 102, a relay coil R1 is supplied with electric current from electric power source 109 via switch 111 set at low speed position Lo, so as to close relay 115 (to establish the continuity of wire 124). When switch 111 is set at high speed position Hi by setting speed shift lever 26 at high speed position 103, relay coil R1 is not supplied with electric current from electric power source 109, thereby opening relay 115 (to interrupt the continuity of wire 124). Further, a PTO clutch-on alarm lamp 126 is electrically connected to wire 124 between relay 115 and solenoid 108a via a branching wire 124a.

Figure 15:
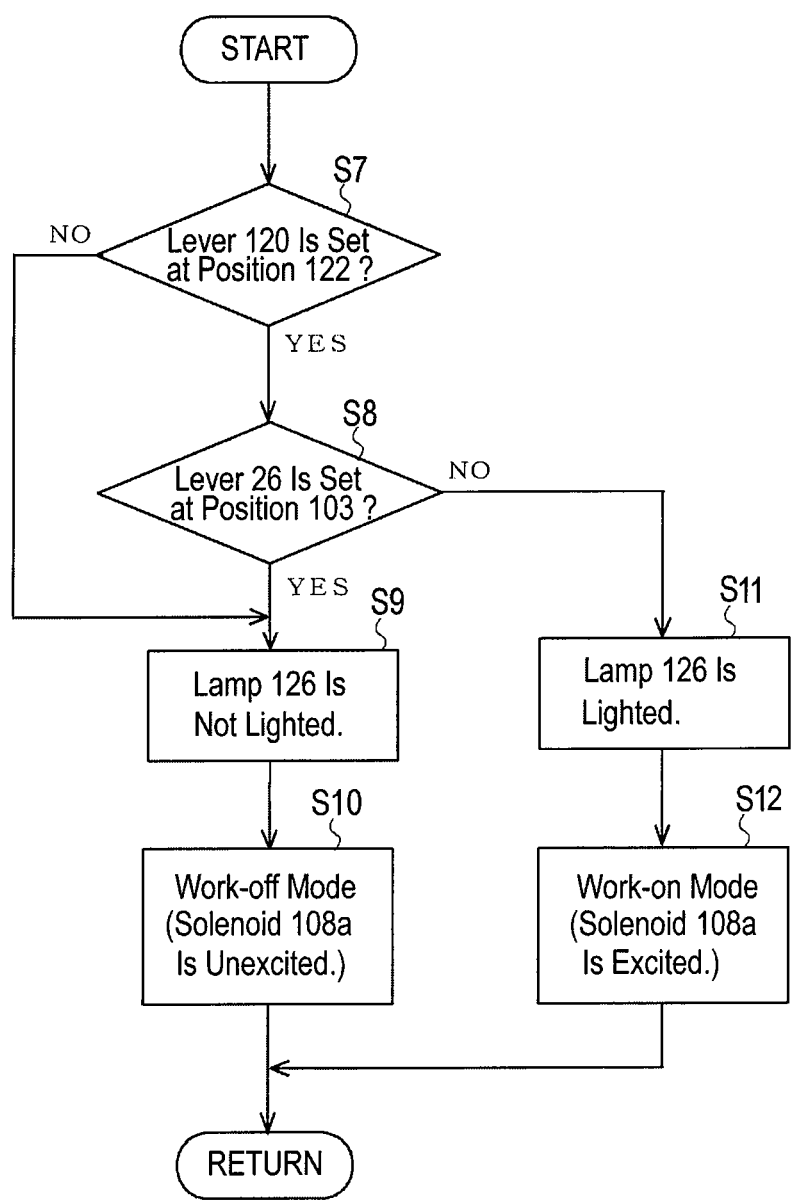
FIG. 15 is a flow chart for controlling a PTO clutch in association with the change of the speed mode of the hydraulic motors by use of the electric circuits of FIG. 13.

In this regard, referring to a flow chart shown in FIG. 15, at first, it is judged whether or not PTO clutch lever 120 is set at clutch-on position 121 by judging whether switch 112 is switched on or off (Step S7). When switch 112 is switched on by setting PTO clutch lever 120 at clutch-on position 121 (Step S7, Yes), it is judged whether or not speed shift lever 26 is set at high speed position 103 by judging whether switch 110 is set at high speed position Hi or low speed position Lo (Step S8). When switch 110 is set at high speed position Hi by setting speed shift lever 26 at high speed position 103 (Step S8, Yes), relay 115 is opened to interrupt the continuity of wire 124, so that PTO clutch-on alarm lamp 126 is not lighted (Step S9), and solenoid 108a is unexcited to set PTO clutch control valve 108 at a clutch-off position L1 for stopping the fluid supply to PTO clutch 30a, thereby disengaging PTO clutch 30a and stopping the driving rotation of rotary blades 20 of mower unit 7. In this way, unless speed shift lever 26 is set at low speed position 102, vehicle 1 is set in a work-off mode (Step S10), wherein the disengagement of PTO clutch 30a is kept to prevent blades 20 from being driven regardless of whether PTO clutch lever 120 is set at clutch-on position 121 or clutch-off position 122.

When switch 112 is switched on by setting PTO clutch lever 120 at clutch-on position 121 (Step S7, Yes) and switch 110 is set at low speed position Lo by setting speed shift lever 26 at low speed position 102 (Step S8, No), relay 115 is closed to complete the continuity of wire 124, so that PTO clutch-on alarm lamp 126 is lighted (Step S11), and simultaneously, solenoid 108a is excited to set PTO clutch control valve 108 at a clutch-on position L2 for supplying fluid to PTO clutch 30a, thereby engaging PTO clutch 30a for driving rotary blades 20 of mower unit 7. In this way, when speed shift lever 26 is set at low speed position 102, vehicle 1 is set in a work-on mode (Step S12), wherein PTO clutch 30a is engaged to allow the driving of blades 20 according to the setting of PTO clutch lever 120 at clutch-on position 121. In other words, the work by working vehicle 1 (in this embodiment, driving of blades 20 of mower unit 7) is allowed only when hydraulic motors 37 are set in the low speed mode.

As an effect of this PTO control, if an operator unexpectedly shifts speed shift lever 26 to high speed position 103 while inserting safety control key 27 in the key slot, relay 115 is opened and PTO clutch 30a is disengaged so as to prevent blades 20 from being driven during unexpected high speed traveling of vehicle 1, thereby ensuring the required sure lawn-mowing. Further, if an operator wishes to move vehicle 1 from one work area to another work area and shifts speed shift lever 26 to high speed position 103 for the movement of vehicle 1, PTO clutch 30a is automatically disengaged to prevent blades 20 from being wastefully driven during the movement of vehicle 1, thereby reducing the operator's trouble in operating manipulators.

Figure 16:
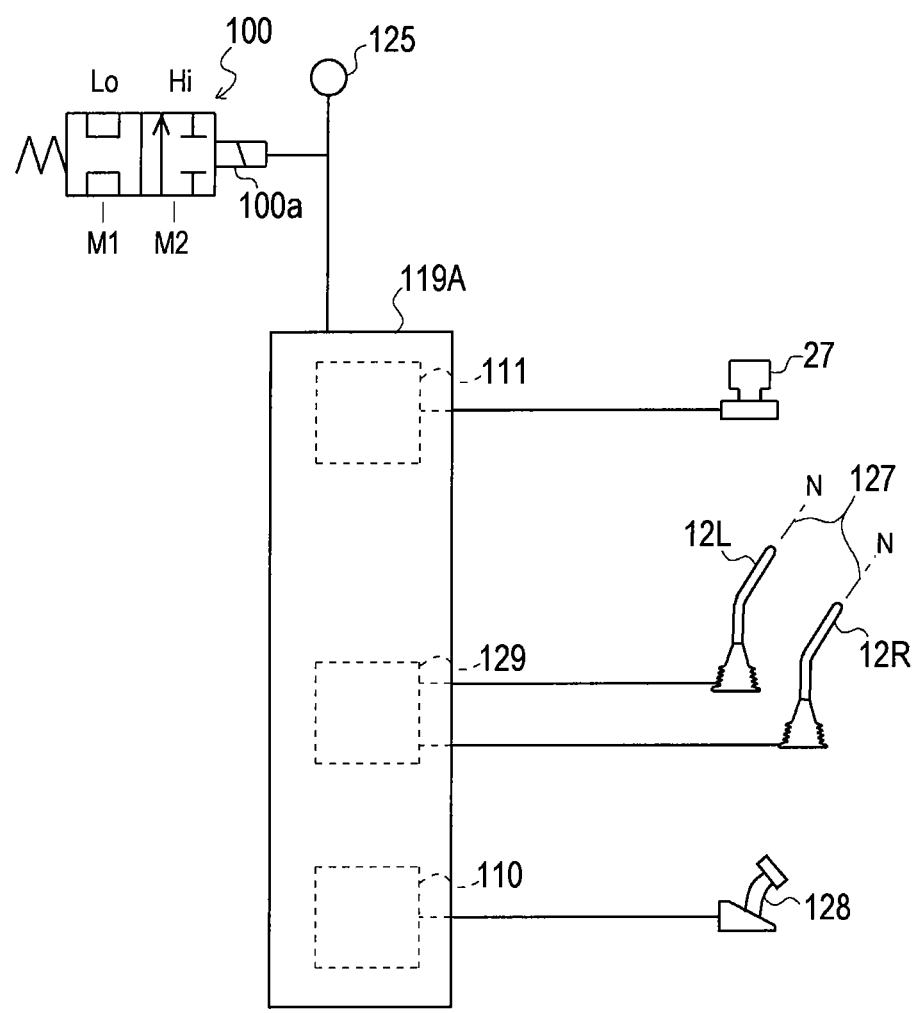
FIG. 16 is a block diagram of an alternative control system for controlling the vehicle transaxle system, the control system being provided with some checking elements with regard to the change of the speed mode of the hydraulic motors.
Figure 17:
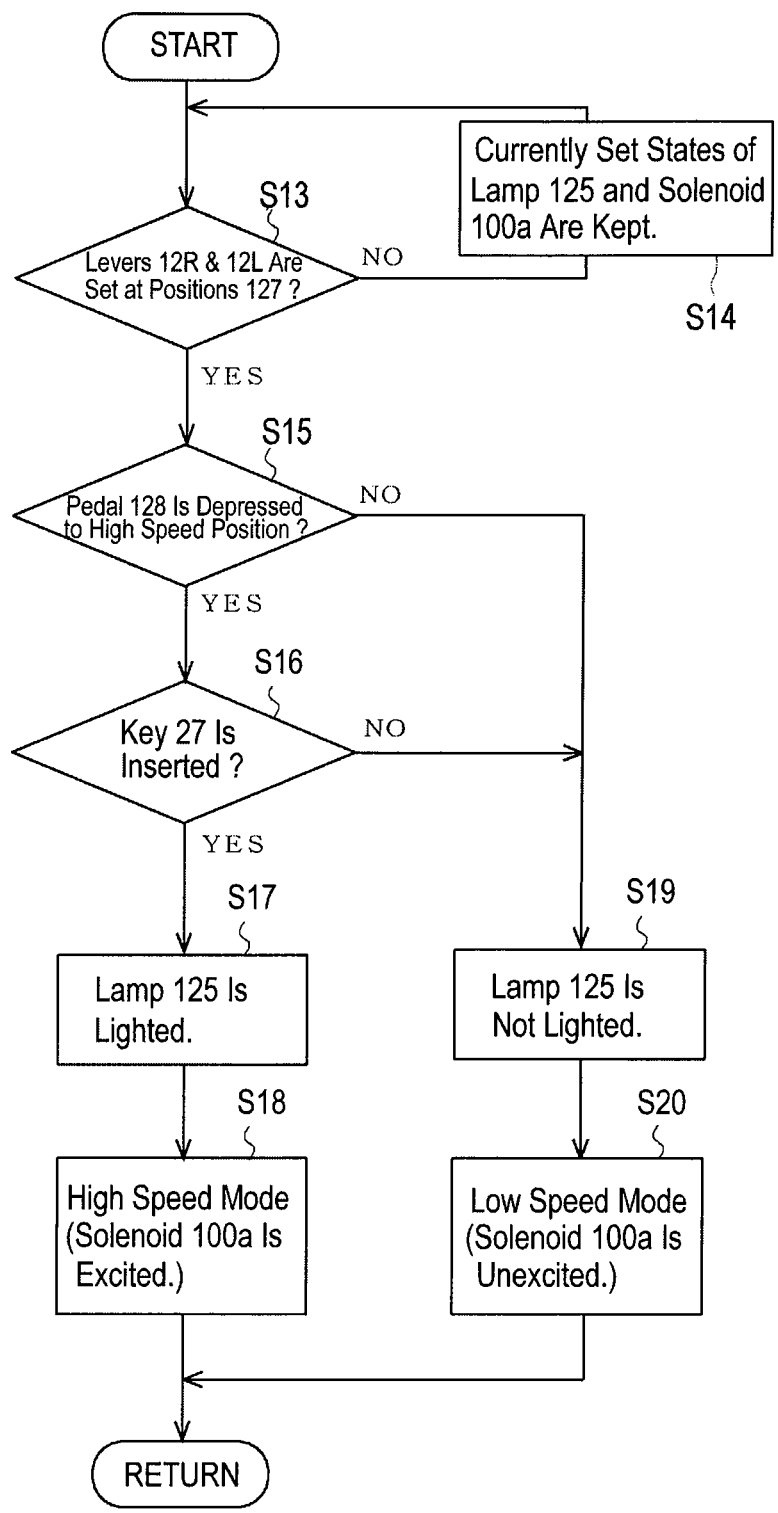
FIG. 17 is a flow chart for limiting the change of the speed mode of the hydraulic motors in association with operation for controlling hydraulic pumps by use of the electric circuit of FIG. 16.

Referring to FIGS. 16 and 17, description will be given of a traveling mode control for allowing hydraulic motors 37 to be shifted into the high speed mode only when both right and left traveling control levers 12R and 12L are set at respective neutral positions 127. In this regard, vehicle 1 is provided with a speed shift pedal 128 instead of speed shift lever 26. Speed shift pedal 128 is selectively undepressed at a low speed pedal position or depressed to a high speed pedal position. This traveling mode control is advantageous for vehicle 1 having speed shift pedal 128 because it prevents hydraulic motors 37 from being unexpectedly shifted into the high speed mode by accidental depression of speed shift pedal 128 to its high speed position.

As shown in FIG. 16, a controller 119A is provided for this traveling mode control. Controller 119A includes switches 110, 129 and 111. Electric power source 109, hydraulic motor control valve 100 with solenoid 100a, and high speed alarm lamp 125 are omitted in FIG. 16. Similar to switch 110 connected to speed shift lever 26, switch 110 in controller 119A is operatively connected to speed shift pedal 128 so as to be selectively set at low speed position Lo according to the undepression of speed shift pedal 128 at the low speed pedal position or set at high speed position Hi according to the depression of speed shift pedal 128 to the high speed pedal position. Switch 111 is switched on or off depending on whether or not safety control key 27 is inserted into the key slot, as mentioned above. Switch 129 is operatively connected to traveling control levers 12R and 12L so as to be switched on or off depending on whether or not both traveling control levers 12R and 12L are set at respective neutral positions 127.

An electric circuit for lighting or not-lighting high speed alarm lamp 125 and for exciting or unexciting solenoid 100a of hydraulic motor control valve 100 is configured in connection with electric power source 109 and switches 110, 129 and 111 in controller 119A, so as to allow the high/low speed mode shift of hydraulic motors 37 according to depression/undepression operation of speed shift pedal 128 only when traveling control levers 12R and 12L are set at respective neutral positions 127. That is, the electric circuit is configured to perform the traveling mode control shown in FIG. 17 described as follows.

Referring to a flow chart shown in FIG. 17, at first, it is judged whether or not both traveling control levers 12R and 12L are set at respective neutral positions 127 by judging whether switch 129 is switched on or off (Step S13). When switch 129 is switched on by setting both traveling control levers 12R and 12L at respective neutral positions 127 (Step S13, Yes), it is judged whether or not speed shift pedal 128 is depressed to the high speed position by judging whether or not switch 110 is set at high speed position Hi (Step S15). When switch 110 is set at high speed position Hi by depressing speed shift pedal 128 to the high speed pedal position (Step S15, Yes), it is judged whether or not safety control key 27 is inserted into the key slot (Step S16) by judging whether switch 111 is switched on or off. When switch 111 is switched on by inserting safety control key 27 in the key slot (Step S16, Yes), high speed alarm lamp 125 is lighted (Step S17), and solenoid 100a is excited to set hydraulic motor control valve 100 at high speed position M2 so as to set hydraulic motors 37 in the high speed mode (Step S18) via interlocking connection mechanism 66 or 66A.

During the setting of both traveling control levers 12R and 12L at respective neutral positions 127, if switch 110 is set at low speed position Lo by setting speed shift pedal 128 is undepressed at the low speed pedal position (Step S15, No), or if safety control key 27 is not inserted in the key slot (Step S16, No), high speed alarm lamp 125 is not lighted (Step S19), and solenoid 100a is unexcited to set hydraulic motor control valve 100 at low speed position M1 so as to set hydraulic motors 37 in the low speed mode (Step S20) via interlocking connection mechanism 66 or 66A.

Unless both traveling control levers 12R and 12L are set at respective neutral positions 127 (Step S13, No), i.e., while vehicle 1 travels by driving at least one of hydraulic motors 37, the currently set excited or unexcited state of solenoid 100a of hydraulic motor control valve 100 is held so as to keep the currently set high or low speed mode of hydraulic motors 37 (Step S14) even if speed shift pedal 128 is shifted between the low speed pedal position and the high speed pedal position.

During the traveling of vehicle 1 by driving at least one of hydraulic motors 37, it may happen that hydraulic motors 37 are set in the low speed mode while speed shift pedal 128 is depressed to the high speed pedal position or that hydraulic motors 37 are set in the high speed mode while speed shift pedal 128 is undepressed at the low speed pedal position. However, as soon as both traveling control levers 12R and 12L reach respective neutral positions 127 (Step S13, Yes), the state of solenoid 100a of hydraulic motor control valve 100 is changed to correspond to the state of switch 110 (on the assumption that safety control key 27 is inserted in the key slot), so that the speed mode of hydraulic motors 37 having disagreed with the pedal position of speed shift pedal 128 becomes correspondent to the pedal position of speed shift pedal 128 (Step S18 or S20).

During the setting of both traveling control levers 12R and 12L at respective neutral positions 127, even if speed shift pedal 128 is still disposed at an unexpected pedal position, both hydraulic pumps 36 are set in respective neutral states so that the shift of speed mode of hydraulic motors 37 does not cause sudden traveling speed change of vehicle 1, and high speed alarm lamp 125 is lighted or not-lighted simultaneously to the change of the solenoid state of hydraulic motor control valve 100 (Step S17 or S19) so that an operator becomes aware of the need to correct the pedal position of speed shift pedal 128 before the operator starts rotating at least one of speed control levers 12R and 12L from neutral position 127. Therefore, vehicle 1 is prevented from being unexpectedly speed-changed by changing the speed mode of hydraulic motors 37.

An alternative interlocking connection means 140 shown in FIG. 18 will be described. Interlocking connection means 140 includes a pair of motor control units 141R and 141L configured identical to each other. Motor control unit 141R is provided for rotating motor control arm 84 of hydraulic motor 37 of right transaxle unit 4R, and motor control unit 141L is provided for rotating motor control arm 84 of hydraulic motor 37 of left transaxle unit 4L.

Each of motor control units 141R and 141L includes a deceleration gearbox 143 and an electric motor 142 (serving as a rotary type actuator) attached to deceleration gearbox 143. Electric motor 142 has an output element whose rotary direction is reversible. Deceleration gearbox 143 incorporates a deceleration gear train which transmits power from the output element of electric motor 142 to an operation arm 144 (serving as a rotatable operation member) pivoted on deceleration gearbox 143. An alternative deceleration drive train without gears may be provided for transmitting power from the output element of electric motor 142 to operation arm 144. Operation arm 144 is rotated in one of opposite directions depending on either one or the other rotary direction of the output element of electric motor 142. A link rod 145 is pivotally connected at one end thereof to a tip of operation arm 144, and is pivotally connected at the other end thereof to the tip of motor control arm 84 (serving as a rotatable operation member).

Figure 18:
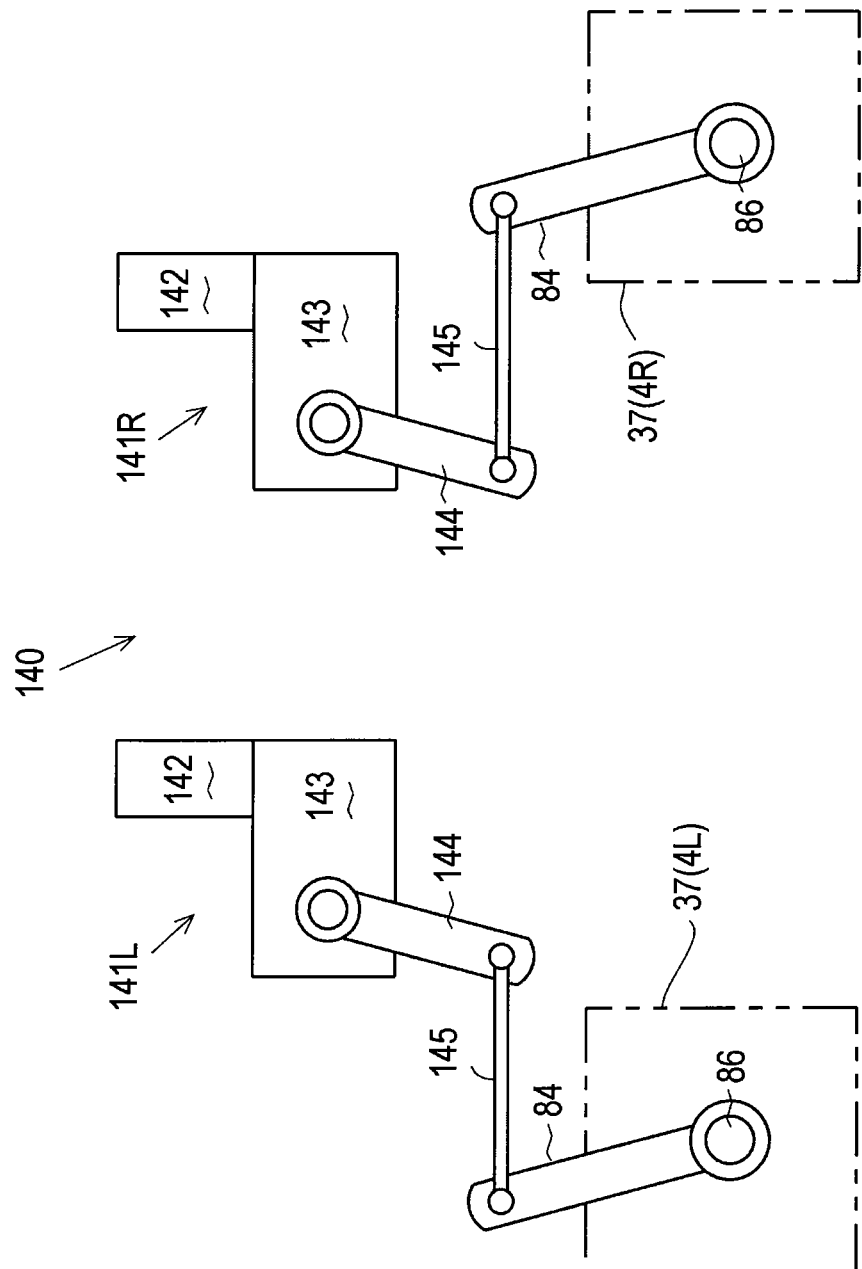
FIG. 18 is a diagram of a third interlocking connection means.

Interlocking connection means 140 shown in FIG. 18 includes an electric circuit (not shown) for controlling electric motors 142 of respective motor control units 141R and 141L so as to synchronously rotate both operation arms 144, thereby synchronously operating motor control arms 84 of both transaxle units 4R and 4L. Interlocking connection means 140 may be provided with sensors for detecting respective positions and rotational speeds of motor control arms 84 (or operation arms 144), thereby providing feedback for controlling electric motors 142.

It is further understood by those skilled in the art that the foregoing description is a preferred embodiment of the disclosed apparatus and that various changes and modifications may be made in the invention without departing from the scope thereof defined by the following claims.

What is claimed is:

1. A zero-turn vehicle transaxle system comprising:
a prime mover;
a pair of right and left axles;
a pair of variable displacement hydraulic pumps driven by power from the prime mover;
a pair of variable displacement hydraulic motors each of which is fluidly connected to a corresponding hydraulic pump so as to drive a corresponding right or left axle;
a pair of movable motor displacement control members, wherein each of the movable motor displacement control members is rotatable to change the displacement of the corresponding hydraulic motor;
a pair of first rotary axial shafts having respective first rotary axes about which each of the movable motor displacement control members rotates;
an interlocking connection means connected to both the movable motor displacement control members of the pair of hydraulic motors;
a pair of first manipulators that are operated independently so as to change respective displacements and delivery directions of the hydraulic pumps, thereby differentially changing respective rotary speeds and directions of the axles;
a second manipulator for operating the interlocking connection means,
wherein the second manipulator is shiftable between a low speed position and a high speed position,
wherein the interlocking connection means is operated by operating the second manipulator so as to synchronously move both the movable motor displacement control members and synchronously change rotary speeds of the respective axles, so that the movable motor displacement control members are shiftable between respective low speed positions for realizing low rotary speeds of the respective axles and respective high speed positions for realizing high rotary speeds of the respective axles;
a controller,
wherein the controller includes a safety switch so that when the safety switch is switched off, the controller commands the interlocking connection means to set the movable motor displacement control members at the respective low speed positions regardless of whether the second manipulator is set at the low speed position or the high speed position, and so that when the safety switch is switched on, the controller allows the interlocking connection means to shift the movable motor displacement control members between the respective low speed positions and the respective high speed positions according to shifting the second manipulator between the low speed position and the high speed position, wherein the zero-turn vehicle transaxle system is adaptable to a vehicle equipped with a working device, and wherein the controller allows the working device to be driven by the prime mover only when the movable motor displacement control members are set at the respective low speed positions;

a hydraulic PTO clutch configured so that the PTO clutch is engaged to transmit power from the prime mover to the working device when fluid is supplied to the PTO clutch, and so that the PTO clutch is disengaged to isolate the working device from the prime mover when fluid is drained from the PTO clutch; and a PTO clutch controlling solenoid valve for controlling the hydraulic fluid supply to the PTO clutch, wherein the PTO clutch controlling solenoid valve supplies fluid to the PTO clutch by having its solenoid excited, and drains fluid from the PTO clutch by having its solenoid unexcited, wherein the controller includes a PTO clutch controlling on/off switch for controlling the solenoid of the PTO clutch controlling solenoid valve so that the PTO clutch controlling on/off switch is switched on to excite the solenoid, and is switched off to unexcite the solenoid, and wherein the controller includes a relay interposed between the PTO clutch controlling on/off switch and the solenoid of the PTO clutch controlling solenoid valve so that while the safety switch and the PTO clutch controlling on/off switch are switched on, the relay having been switched on is switched off to unexcite the solenoid once the second manipulator is shifted to the high speed position.

2. The zero-turn vehicle transaxle system according to claim 1, wherein the interlocking connection means is allowed to be operated to move the movable motor displacement control members only when the first manipulators are operated to set both the hydraulic pumps in respective neutral states.

3. The zero-turn vehicle transaxle system according to claim 1, wherein a pair of deceleration gearboxes incorporate respective deceleration gear trains for transmitting power to the respective second rotary axial shafts that are pivoted on the respective deceleration gearboxes so that the second arms are disposed outside of the respective deceleration gearboxes.

4. The zero-turn vehicle transaxle system according to claim 1, wherein the interlocking connection means includes:

a pair of first arms that extended radially from the respective first rotary axial shafts, wherein the first arms rotate together with the respective first rotary axial shafts about the respective first rotary axes, and wherein the first arms are disposed outside of housings incorporating the respective hydraulic motors and the respective movable motor displacement control members;

a pair of rotary actuators having respective second rotary axial shafts having respective second rotary axes, wherein the rotary actuators have respective second arms extended radially from the respective second axial shafts so as to serve as output elements of the respective rotary actuators, wherein the second arms rotate together with the respective second rotary axial shafts about the respective second rotary axes; and a pair of connection members connecting ends of the respective first arms to ends of the respective second arms so as to rotate the respective first arms according to rotations of the respective second arms, wherein the controller controls rotations of the second arms of the respective rotary actuators so as to synchronously rotate both the movable motor displacement control members.

\* \* \* \* \*